(12) United States Patent
Lehmann et al.

(10) Patent No.: US 9,967,196 B2
(45) Date of Patent: May 8, 2018

(54) SYSTEMS AND/OR METHODS FOR RESOURCE USE LIMITATION IN A CLOUD ENVIRONMENT

(71) Applicant: Software AG, Darmstadt (DE)

(72) Inventors: Marc Lehmann, Blieskastel (DE); Christoph Wagmann, Bexbach (DE)

(73) Assignee: SOFTWARE AG, Darmstadt (DE)

( * ) Notice: Subject to any disclaimer, the term of this patent is extended or adjusted under 35 U.S.C. 154(b) by 367 days.

(21) Appl. No.: 14/542,880

(22) Filed: Nov. 17, 2014

(65) Prior Publication Data

US 2016/0142323 A1 May 19, 2016

(51) Int. Cl.
*G06F 15/173* (2006.01)
*H04L 12/819* (2013.01)
*H04L 12/917* (2013.01)

(52) U.S. Cl.
CPC .......... *H04L 47/215* (2013.01); *H04L 47/76* (2013.01)

(58) Field of Classification Search
None
See application file for complete search history.

(56) References Cited

U.S. PATENT DOCUMENTS

| | | | |
|---|---|---|---|
| 8,190,593 B1 * | 5/2012 | Dean | G06F 17/30864 707/707 |
| 8,799,998 B2 | 8/2014 | Li | |
| 2006/0143350 A1 * | 6/2006 | Miloushev | G06F 9/5016 710/242 |
| 2007/0070895 A1 * | 3/2007 | Narvaez | H04L 12/5693 370/230 |
| 2008/0320490 A1 * | 12/2008 | Biro | G06F 9/50 719/313 |

(Continued)

FOREIGN PATENT DOCUMENTS

WO  2013/184121  12/2013

OTHER PUBLICATIONS

Jose Angel Bañares et al., "Revenue Creation for Rate Adaptive Stream Management in Multi-Tenancy Environments," Economics of Grids, Clouds, Systems, and Services, Copyright 2013, Lecture Notes in Computer Science vol. 8193, pp. 122-137.
IBM Websphere Telecom Web Services Server, Version 6.1.1, "Traffic Shaping Common Component," retrieved Nov. 17, 2014, pp. 1-3. http://www-01.ibm.com/support/knowledgecenter/SS2PVA_6.1.1/com.ibm.twss.admin.doc/traffic_c.html.

(Continued)

*Primary Examiner* — Umar Cheema
*Assistant Examiner* — John Fan
(74) *Attorney, Agent, or Firm* — Nixon & Vanderhye P.C.

(57) ABSTRACT

Certain example embodiments relate to techniques for dynamic resource use limitations in a cloud computing environment. A service request from a user is received, in connection with a first application process of the application processes executing in the environment. A resource strategy based on the received service request is generated in connection with the first application process. The resource strategy specifies at least one resource shared by the application processes and an amount of the at least one resource for use by the first application process to subsequently perform a service requested. In connection with a resource controller process different from the first application process, a determination is made regarding whether the generated resource strategy is feasible. Either the service is performed (e.g., when the resource strategy is feasible), or the resource strategy is revised and re-submitted to the resource controller process (e.g., when the resource strategy is infeasible).

22 Claims, 16 Drawing Sheets

(56) References Cited

U.S. PATENT DOCUMENTS

| | | | | |
|---|---|---|---|---|
| 2010/0011282 | A1* | 1/2010 | Dollard | G06F 17/241 |
| | | | | 715/233 |
| 2012/0158621 | A1* | 6/2012 | Bennett | G06F 17/30675 |
| | | | | 706/12 |
| 2014/0222866 | A1* | 8/2014 | Joneja | G06F 17/30073 |
| | | | | 707/785 |

OTHER PUBLICATIONS

Apache HTTP Server Version 2.5—Apache Module Mod-Ratelimit, retrieved Nov. 17, 2014, pp. 1-3. http://httpd.apache.org/docs/trunk/mod/mod_ratelimit.html.

Amazon.com—Tech0(n) Presentation, "Fail Smart," retrieved Nov. 17, 2014, pp. 1-29. http://romania.amazon.com/techon/presentations/FailSmart_IgorSpac.pdf.

Rouven Krebs et al., "Resource Usage Control in Multi-Tenant Applications," retrieved Nov. 17, 2014, pp. 1-10. https://sdqweb.ipd.kit.edu/publications/pdfs/KrSpAhKo2014_CCGrid_ResourceIsolation.pdf.

Rouven Krebs et al., "Comparison of Request Admission Based Performance Isolation Approaches in Multi-Tenant SaaS Applications," retrieved Nov. 17, 2014, pp. 1-6. https://sdqweb.ipd.kit.edu/publications/pdfs/KrLo2014_Closer_IsolationTypes.pdf.

* cited by examiner

```xml
<strategy>
  <bucketownerid>1</bucketownerid>
  <tenant type="premium">premium</tenant>
  <resources>
    <resource kind="network bandwidth">50mbit</resource>
    <resource kind="cpu cores">4</resource>
  </resources>
  <users>
    <user privilege="admin">
      <resources>
        <resource kind="network bandwidth">80%</resource>
        <resource kind="cpu cores">3</resource>
      </resources>
    </user>
    <user privilege="user">
      <resources>
        <resource kind="network bandwidth">20%</resource>
        <resource kind="cpu cores">2</resource>
      </resources>
    </user>
  </users>
  <tasks>
    <task priority="high" estimatedlifetime="long">
      <users>
        <user privilege="admin">
          <resources>
            <resource kind="network bandwidth">80%</resource>
            <resource kind="cpu cores">3</resource>
          </resources>
        </user>
        <user privilege="user">
          <resources>
            <resource kind="network bandwidth">1%</resource>
            <resource kind="cpu cores">1</resource>
          </resources>
        </user>
      </users>
    </task>
  </tasks>
</strategy>
```

FIG. 4

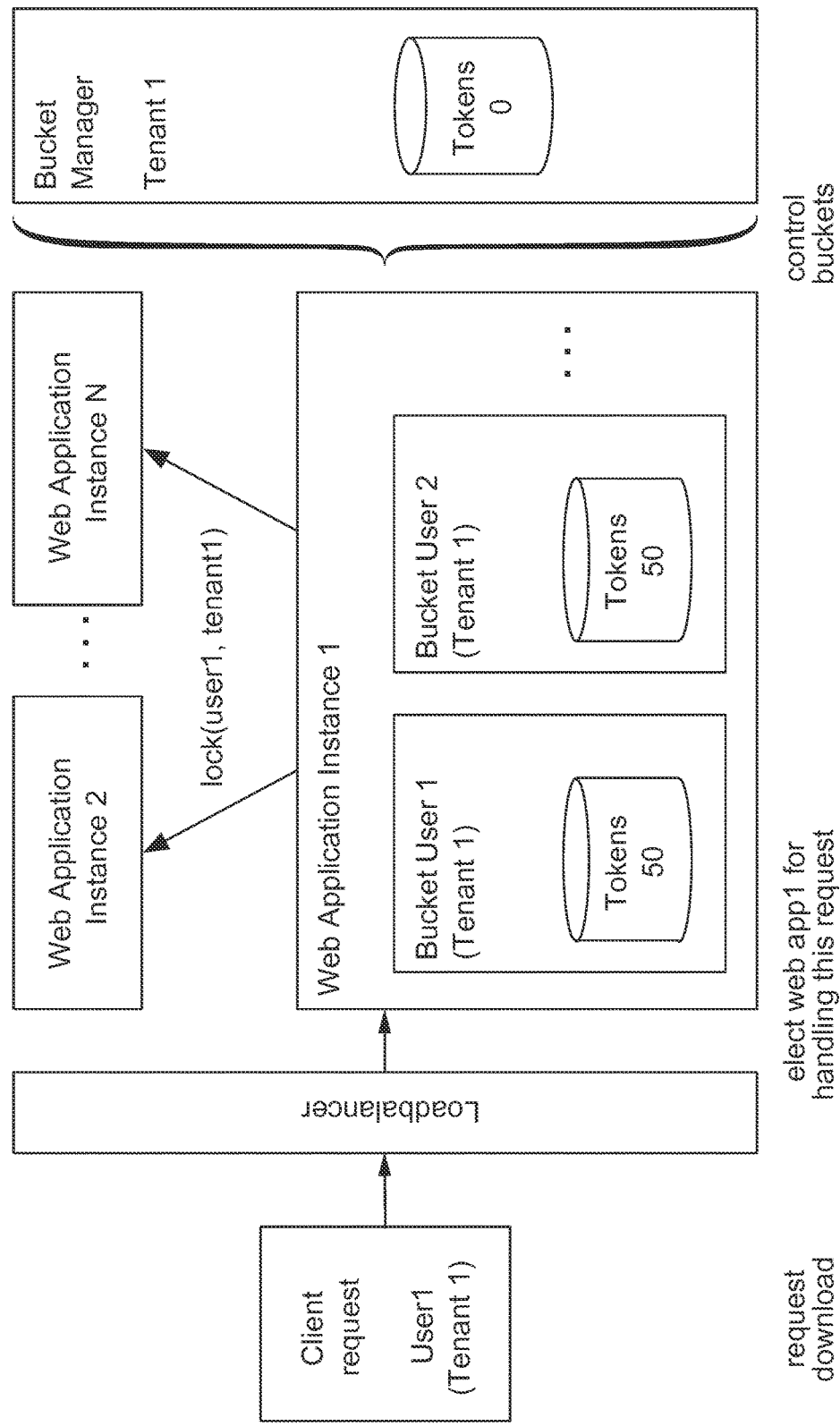

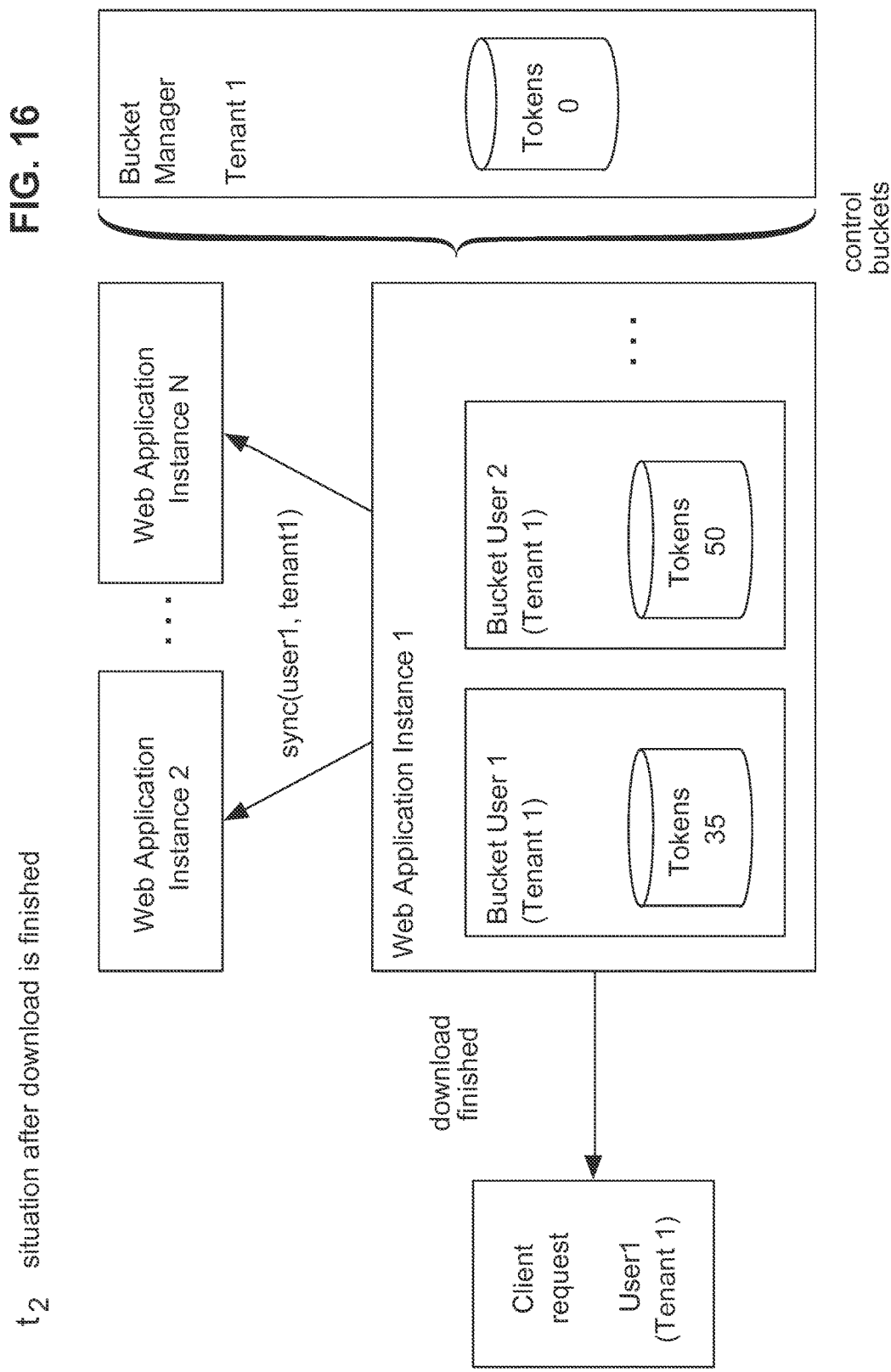

SYSTEMS AND/OR METHODS FOR RESOURCE USE LIMITATION IN A CLOUD ENVIRONMENT

TECHNICAL FIELD

Certain example embodiments described herein relate to techniques for computer processing. More particularly, certain example embodiments relate to techniques for dynamic resource use limitations in a cloud computing environment.

BACKGROUND AND SUMMARY

Current web applications are often deployed in a distributed manner in a cloud environment. They are often scalable in that the number of instances of a web application may increase as the workload increases. An instance of a web application may be shared between many users, or between many tenants that each have one or more users. In such a cloud environment, a single user, a tenant, or a task can easily cause a denial of service for other users and/or tenants, e.g., by simultaneously or near simultaneously consuming too many resources such as CPU time, network bandwidth, memory, and/or the like. Such occurrences of denial of service can be relatively frequent because a tenant's resource needs can fluctuate, the mix of work requests handled by the system can change from moment to moment, etc.

In order to avoid such situations, many systems implement resource use limitation techniques. For instance, in many current cloud-based systems, resource use limits are realized using a simple token bucket algorithm. A token bucket algorithm is based on the idea of a fixed capacity bucket into which tokens, usually representing a work package (e.g., units of CPU time, units of network bandwidth, units of memory etc., used when performing a service), are added at fixed rate. Each time a service is requested by a user, the service is checked for conformance to the defined bucket limits. The bucket is inspected in order to guarantee that it contains a sufficient number of tokens to process the request. If the bucket contains a sufficient number of tokens, then the tokens are removed from the bucket and the request is served. If the bucket is empty or contains an insufficient number of tokens, then the request is processed only partially or possibly not at all. There are various ways to handle a request that does not receive the required number of tokens such as, for example, queuing the request until a sufficient number of tokens has accumulated, serving the request partially, dropping the request, etc.

The token bucket algorithm is well known and commonly used in hardware routers and networking software. However, the token bucket algorithm may not be suitable for use in a distributed environment where multiple applications or nodes are serving requests in parallel. The solutions available on the market today use either a single bucket for all the servers (e.g., web application instances), a dedicated bucket for each server, or some form of hierarchical buckets. Yet none of these approaches satisfies the requirements of a distributed, multi-tenant aware cloud environment. FIG. 1 and FIG. 2 illustrate example token bucket implementations in some current cloud environments.

In FIG. 1, each server 102 and 103 is provided with its own token bucket 104 and 105, respectively, in a cloud environment 100. The Apache HTTP Server™ provides limited resource use limitation capabilities in which each server maintains its own independent tokens, as illustrated in FIG. 1. Each bucket 104 and 105, and hence the workload for each server 102 and 103, is managed independently in the scenario shown in FIG. 1.

The IBM WebSphere Telecom Web Services Server™ and Amazon Web Services™ provide rate limitation in a manner similar to that shown in the cloud environment 200 of FIG. 2. FIG. 2 is a high level illustration of an implementation where two servers—servers 202 and 203—each has its own token bucket (token buckets 204 and 205), which is supplied with tokens from a global token bucket 206. The global token bucket 206 enables resource limitation at the level of a container, which is the execution environment common to both servers 202 and 203, rather than at the individual server level.

The techniques illustrated in FIGS. 1 and 2 provide for resource limitation at the server level, but they unfortunately are not suitable for distributed multi-tenant cloud environments. Neither technique, for example, provides for limiting resources at a tenant or user level. In a multi-tenant cloud environment, an application instance is shared by plural tenants, often with each tenant requiring a dedicated share of the instance.

Thus, it will be appreciated that it would be desirable to improve on these techniques, e.g., to provide for dynamic resource use limitations in a cloud computing environment.

An example embodiment includes a method for limiting usage of resources in a distributed computing environment. The method includes receiving, in connection with a first application process of a plurality of application processes executing in the distributed computing environment, a service request from a user. A resource strategy is generated in connection with the first application process. The resource strategy is based on the received service request, and specifies at least one resource shared by the plurality of application processes and an amount of the at least one resource for use by the first application process to subsequently perform a service requested in the service request. The method also includes determining in connection with a resource controller process different from the first application process whether the generated resource strategy is feasible, and either (a) performing the service, when the determining determines that the resource strategy is feasible, or (b) revising the resource strategy and re-submitting the revised resource strategy to the resource controller process when the determining determines that the resource strategy is not feasible.

According to some example embodiments, the method may further include ensuring revision of the resource strategy and re-submitting by one of the plurality of application processes the revised resource strategy to the resource controller process, and subsequent to a determination by the resource controller process that the revised resource strategy is feasible, performing the service in accordance with the revised resource control strategy.

According to some example embodiments, the method may further include configuring a hierarchy of token buckets, the hierarchy having at least three levels and a total number of tokens in the token buckets corresponding to a maximum capacity of the at least one resource, and distributing the tokens in accordance with a predetermined allocation of the at least one resource to a plurality of users. The determining may include determining that the resource strategy is not feasible based on a number of tokens in a token bucket corresponding to the user.

According to some example embodiments, the method may further include configuring a hierarchy of token buckets, with the hierarchy having at least three levels and a total number of tokens in the token buckets corresponding to a maximum capacity of the at least one resource, and distributing the tokens in accordance with a predetermined allocation of the at least one resource to a plurality of users. The hierarchy comprises a global level token bucket at the highest level, a plurality of tenant level token buckets at an intermediate level with each tenant of the distributed computing system having a corresponding tenant level token bucket, and a plurality of user level token buckets at the lowest level with each of the plurality of users having a corresponding user level token bucket. The method may further include performing the service and consuming a number of said tokens corresponding to the amount of the at least one resource from the user level token bucket corresponding to the user.

According to some example embodiments, the the performing of the service may include locking the user level token bucket corresponding to the user at others of the plurality of application processes before accessing the at least one resource, using the at least one resource, and synchronizing the user level token bucket corresponding to the user at others of the plurality of application processes to update a status of the user level token bucket corresponding to the user after the use. The updated status includes reducing a number of tokens in the user level token bucket corresponding to the user by a number of the consumed tokens.

The determining may include determining that a number of tokens in the user level token bucket corresponding to the user equals or exceeds a number of tokens corresponding to said amount of the at least one resource for use by the first application process.

The determining may further include determining that the user level token bucket corresponding to the user is not locked by another of the plurality of application processes.

The distributing may include distributing the tokens in accordance with a predetermined allocation of the at least one resource to said each tenant and said plurality of users.

According to some example embodiments, the determining may include determining by the resource controller process different from the first application process that the generated resource strategy is not feasible. The method may further include: annotating the generated resource strategy to include information regarding an amount available of the at least one resource; returning, by the resource controller process to the first application process, the annotated resource strategy; revising the generated resource strategy based on the annotated resource strategy; and re-submitting the revised resource strategy to the resource controller process.

The revising may include specifying a reduced amount of the at least one resource, with the reduced amount being determined based on an estimated minimum amount of the at least one resource required for the service.

According to some embodiments, the plurality of application processes consists of instances of a same application.

An example embodiment includes a system for limiting usage of resources in a distributed computing environment, the system comprising a plurality of processing systems communicatively connected by a network, each comprising at least one processor. The plurality of processing systems being configured to at least: receive, by a first application process of a plurality of application processes, a service request from a user; generate, by the first application process, a resource strategy based on the received service request, the resource strategy specifying at least one resource shared by the plurality of application processes and an amount of the at least one resource for use by the first application process to subsequently perform a service requested in the service request; determine by a resource controller process different from the first application process whether the generated resource strategy is feasible; and perform one of (a) the service when the determining determines that the resource strategy is feasible, and (b) revision of the resource strategy and re-submission of the revised resource strategy to the resource controller process when the determining determines that the resource strategy is not feasible.

The distributed computing environment may include a multi-tenant cloud computing environment.

The example system includes revising the resource strategy and re-submitting by one of the plurality of application processes the revised resource strategy to the resource controller process, and subsequent to a determination by the resource controller process that the revised resource strategy is feasible, performing the service in accordance with the revised resource control strategy.

The plurality of processing systems of the example system may be further configured to: configure a hierarchy of token buckets, the hierarchy having at least three levels and a total number of tokens in the token buckets corresponding to a maximum capacity of the at least one resource; and distribute the tokens in accordance with a predetermined allocation of the at least one resource to a plurality of users. The hierarchy may comprise a global level token bucket at the highest level, a plurality of tenant level token buckets at an intermediate level with each tenant of the distributed computing system having a corresponding tenant level token bucket, and a plurality of user level token buckets at the lowest level with each of the plurality of users having a corresponding user level token bucket. The performing may comprise performing the service and consuming a number of said tokens corresponding to the amount of the at least one resource from the user level token bucket corresponding to the user.

The processing systems of the example system may be configured to perform the service by: locking the user level token bucket corresponding to the user at others of the plurality of application processes before accessing the at least one resource; using the at least one resource; and synchronizing the user level token bucket corresponding to the user at others of the plurality of application processes to update a status of the user level token bucket corresponding to the user after the use, wherein the updated status includes reducing a number of tokens in the user level token bucket corresponding to the user by a number of the consumed tokens.

According to some example embodiments, the processing systems are configured to determine, using the resource controller process different from the first application process, that the generated resource strategy is not feasible. They may be further configured to: annotate the generated resource strategy to include information regarding an amount available of the at least one resource; return, by resource controller process to the first application process, the annotated resource strategy; revise the generated resource strategy based on the annotated resource strategy; and re-submit the revised resource strategy to the resource controller process.

Another example embodiment includes a non-transitory computer readable storage medium having stored thereon instructions which, when executed by at least one processor of a plurality of processing systems in a distributed computing environment, causes the plurality of processing systems to at least perform a set of operations. The set of operations includes receiving, by a first application process of a plurality of application processes, a service request from a user; generating by the first application process a resource strategy based on the received service request, the resource strategy specifying at least one resource shared by the plurality of application processes and an amount of the at least one resource for use by the first application process to subsequently perform a service requested in the service request; determining by a resource controller process different from the first application process whether the generated resource strategy is feasible; and performing one of (a) the service, when the determining determines that the resource strategy is feasible, and (b) revision of the resource strategy and re-submission of the revised resource strategy to the resource controller process when the determining determines that the resource strategy is not feasible.

According to some example embodiments, the performing includes revising the resource strategy and re-submitting by one of the plurality of application processes the revised resource strategy to the resource controller process, and subsequent to a determination by the resource controller process that the revised resource strategy is feasible, performing the service in accordance with the revised resource control strategy.

According to some example embodiments, the instructions further cause the processing systems to: configure a hierarchy of token buckets, the hierarchy having at least three levels and a total number of tokens in the token buckets corresponding to a maximum capacity of the at least one resource; and distribute the tokens in accordance with a predetermined allocation of the at least one resource to a plurality of users. The hierarchy may include a global level token bucket at the highest level, a plurality of tenant level token buckets at an intermediate level with each tenant of the distributed computing system having a corresponding tenant level token bucket, and a plurality of user level token buckets at the lowest level with each of the plurality of users having a corresponding user level token bucket. The performing may include performing the service and consuming a number of said tokens corresponding to the amount of the at least one resource from the user level token bucket corresponding to the user.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 illustrates an example strategy specified as an XML data structure or document, in accordance with certain example embodiments;

FIGS. 14-16 illustrate a token distribution scenario, according to certain example embodiments.

DETAILED DESCRIPTION

Certain example embodiments relate to techniques for dynamic resource use limitations in a cloud computing environment. As described above, the resource limitation techniques that are currently in use, use either a single bucket for all the servers, a dedicated bucket for each server or some form of hierarchical buckets, and do not satisfy requirements of a distributed, multi-tenant aware cloud environment.

In certain example embodiments, token bucket techniques are extended to provide for dimensional token buckets and a backchannel that allows for interactive communication with the participating servers (e.g., web applications). Certain example embodiments provide a multi-dimensional token bucket mechanism for dynamically limiting resources in a cloud environment. Certain example embodiments satisfy requirements of a distributed cloud environment and allow the management of multiple buckets, which enables a more fine-grained control of resources on a user or tenant level. Certain example embodiments provide a bi-directional communication channel between the token management components and the applications allowing a dynamic rebalancing of buckets. Unlike conventional resource limitation solutions, in which resource limitation is realized as a piece of hardware or in a single piece of software, certain example embodiments may provide several, independent modules, e.g., a dispatcher service and a strategy controller that handle application-specific needs of the participating application, which can be distributed if necessary and/or desirable.

As enabled by certain example embodiments, in a distributed cloud environment, all nodes of a cluster may share a single bucket that is synchronized using a process in which each node may remove tokens from the shared bucket after it has served a request. Additionally, in a multi-tenant aware environment, there might be a need and/or desire to create individual buckets, e.g., a bucket belonging to an IP address range, single user or tenant, etc., by using a multi-dimensional token bucket approach.

Figure 1:
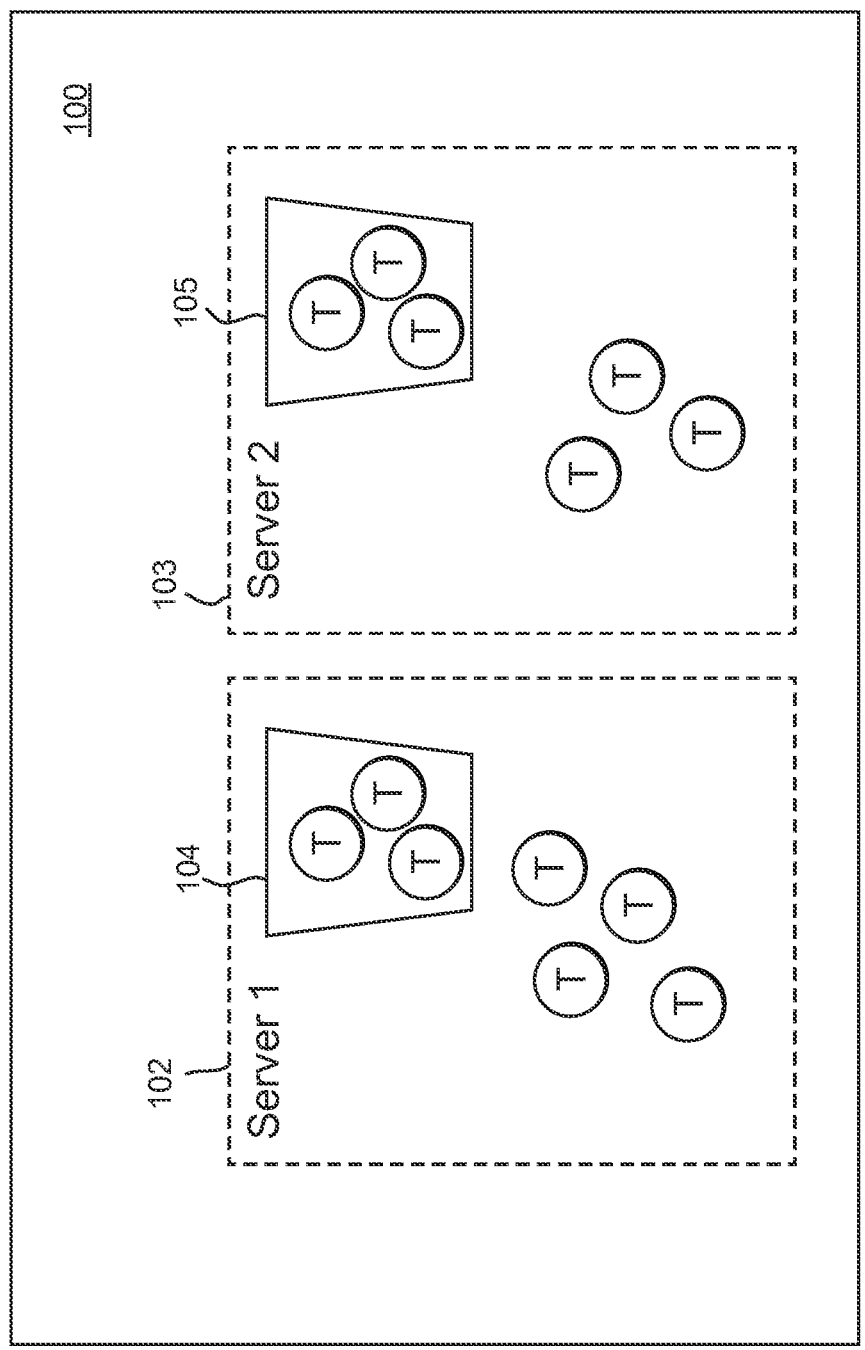
FIG. 1 is a high level illustration of an execution environment, with each server independently managing a token bucket to regulate resource usage.
Figure 2:
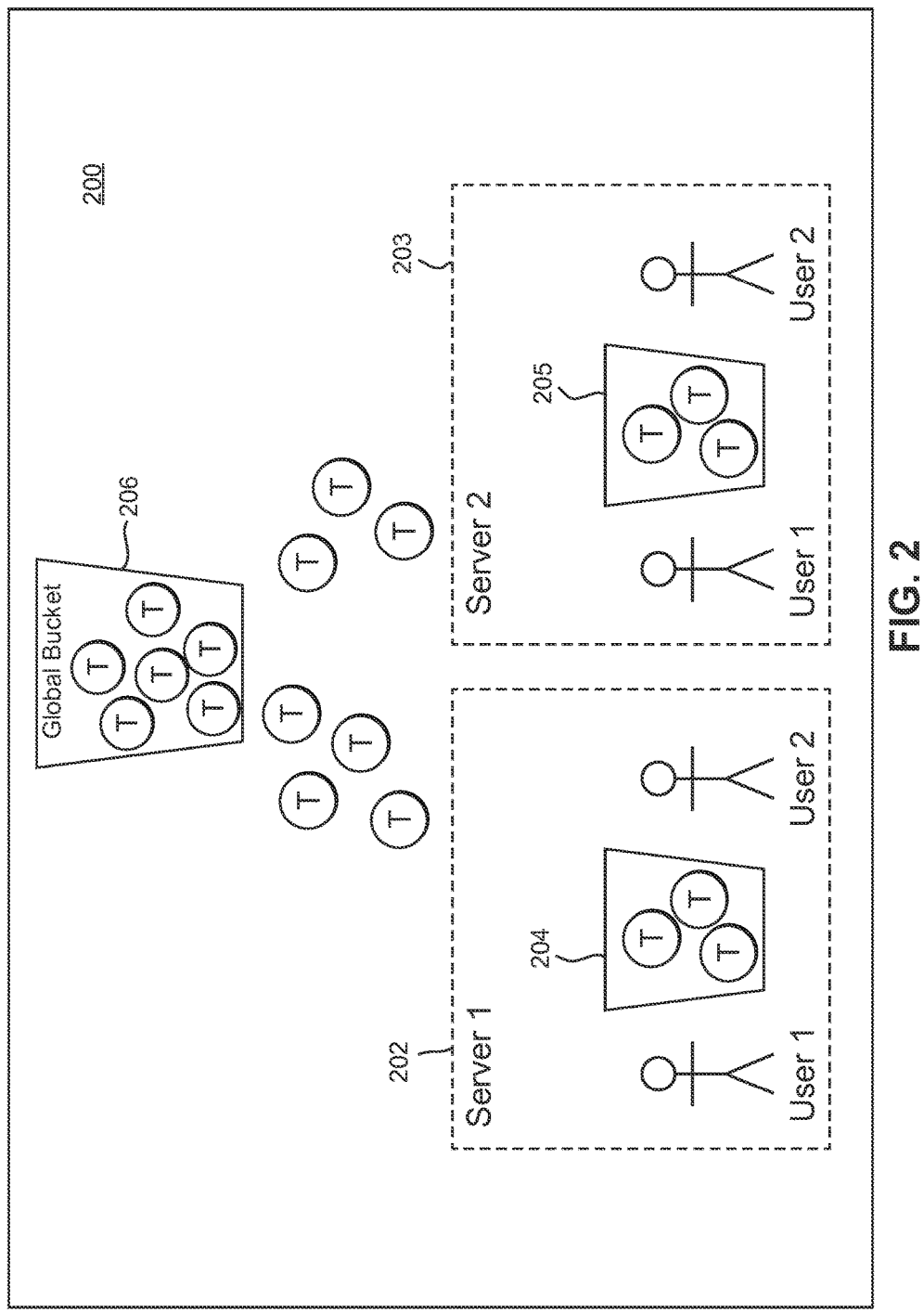
FIG. 2 is a high level illustration of an execution environment, with each server's token bucket being supplied by a global token bucket to regulate resource usage.
Figure 3:
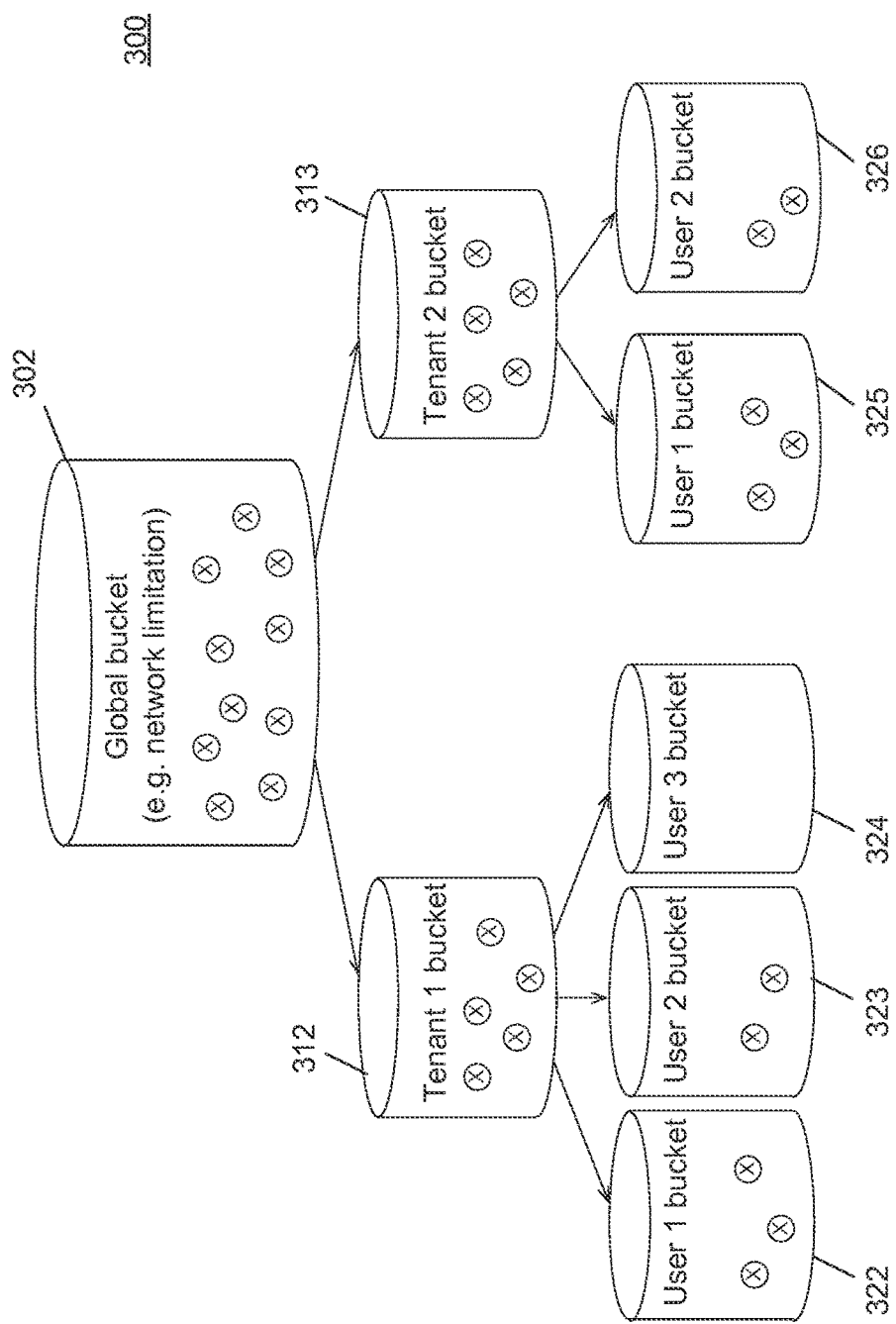
FIG. 3 schematically illustrates a multi-dimensional token bucket, in accordance with certain example embodiments.

FIG. 3 schematically illustrates a multi-dimensional token bucket 300, according to certain example embodiments. As shown in FIG. 3, the token bucket implementation of at least certain example embodiments comprises a hierarchy of at least three levels of token buckets: a global token bucket, a plurality of tenant token buckets, and one or more user token buckets for each tenant token bucket. The global token bucket 302 represents the overall resource limitation (e.g., network resource limitation). The tenant token buckets 312 and 313 represent respective portions of the overall resource limitation assigned to each tenant. The user token buckets 322, 323, 324, 325, and 326 are each assigned a respective portion of the resource limitation of the corresponding tenant token bucket 312 or 313. The allocation of the resource limitation from a parent-level token bucket to its child-level token-buckets can be in accordance with any distribution. In the FIG. 3 illustration, for example, the 10 tokens of the global bucket are equally allocated to each of tenant token buckets, and the tenant bucket 312 resource limitation of five tokens is distributed as 3, 2, and 0 tokens to user buckets 322, 323, and 324, respectively. When compared to the technique described in relation to FIG. 2, the adding of an additional layer of buckets facilitates the provision of resource limitation at a user or tenant level. Thus, when resources are controlled in accordance with the multi-dimensional token bucket 300, a single tenant cannot (unless specifically configured to do so) consume all the tokens of the global bucket representing the overall resource limitation, and therefore cannot occupy the available resources completely. The same is true for each user of a tenant, e.g., a single user cannot consume all the tokens of a tenant thereby leading to a lockout of other users from the service or application.

The additional layer added to the token bucket mechanism in certain example embodiments allows greater flexibility, but of course also leads to a greater complexity and therefore each request (e.g., processing request) that is handled using the mechanism is more expensive and could need additional resources. To reduce and/or avoid this overhead, according to certain example embodiments, requests to the web application are classified and only those that would have an impact on other users or tenants, e.g., document upload or download, are handled by the resource use limitation mechanism.

In order to effectively classify the incoming requests, some knowledge about semantics of each request is required. For example, the semantics of a request can be used to determine whether the request is for an expensive document workflow, rather than something less resource intensive. Examples of expensive document workflows may include long running backup/restore tasks, complex reports, comprehensive simulations, and scheduled tasks of any kind. An example of a less resource intensive task may be providing metadata of a document in response to a request.

Therefore, certain example embodiments involve embedding aspects of the proposed token bucket mechanism into each application of concern. In case of document workflows, a resource use limitation system according to certain example embodiments may include the ability to track down the resource limitation, for example, the network limitation and/or hard disk usage, on an end user basis even though a given user belongs to a tenant. For example, a premium service may exist in which all users of a particular tenant could benefit from a higher transfer rate. Additionally, special users such as administrator or a user with special functional privileges like an approver in a high-prioritized workflow may require even a higher level of service. The special users of this premium tenant may have higher priority for resource allocation than the other users of this tenant, although these other users may have higher priority compared to users of a non-premium tenant.

With respect to long running backup/restore tasks, the proposed resource control system ensures that the memory consumption and network usage is within a limit that all other services within the cloud infrastructure are still available and usable in such a way that they do not become too slow and therefore unusable. In contrast to the example above concerning the document workflows, in this case, one does not only have resource limitation at the network level, but also needs to share the CPU load, memory usage, and so on. If one knows that a specific backup or restore task will take a lot of resources and time, one could schedule this task to gain planning reliability. If one knows the overall usage of the resource on a daily basis, one could determine a timeframe and a sufficient amount of resources to ensure that this task does not compromise the overall usage of the cloud services. One may encounter the same issues with long running reports, or comprehensive and resource intensive simulation tasks. Similar to the backup/restore scenario, effective utilization of resources may require the same flexibility to break down the limitation to users per tenant or service per tenant, e.g., with consideration given to all resources available.

In terms of planning reliability, the resource use limitation system according to certain example embodiments provides for each task, service, or application to operate to enforce their own strategy to gain enough resources. A strategy (or "resource strategy" as sometimes referred to herein) as used to herein is a generic data structure that defines the detailed resource request in form of a multi-layered description. The strategy provided by the application or service may be evaluated to determine if this request is realistic and could be allocated in respect to the available resources and usage of other resources.

FIG. 4 illustrates an example strategy 400 specified as an XML data structure or document. The example strategy 400 identifies the relevant bucket at 402, and also identifies the tenant as a premium tenant at 403. The tenant level resource requirement is specified at 404, specifying 50 mbit of the resource network bandwidth and 4 of the resource CPU cores. At 405, two users—a user with "admin" privileges and a user with "user" privileges—are specified, together with the resource requirement for each of the two users. In the example strategy 400, between the two users, the network bandwidth resource of 50 mbits is split at 80 to 20, and the 4 CPU cores is over-allocated at 3 and 2. At 406, a task is specified as having "high" priority and a "long" estimated lifetime. For the specified task, the resource requirements for each user are also specified. FIG. 4 is an example only, and a person of ordinary skill will understand that the strategy may be specified in various structures, formats, languages, etc. Moreover, the strategy may address more or less buckets, resources, tenants, users, and tasks, as required and/or desired by particular situations.

In order to allow each task, service, and/or application to enforce their own strategy, the resource use limitation system according to certain example embodiments includes several operations that are formed as including a server component as well as a client component each service implements to establish a feedback loop between the server components and a client service. This allows an interactive communication in which client components can send their requests, including the detailed resource allocation options, to the controller component that evaluates the sent strategy and sends back a strategy disposition message that indicates whether the strategy is approved or declined. This strategy disposition message may contain detailed information about the actual resources and options available to the client component. The client component may then re-request a new strategy prepared by taking into account the received information.

Figure 5:
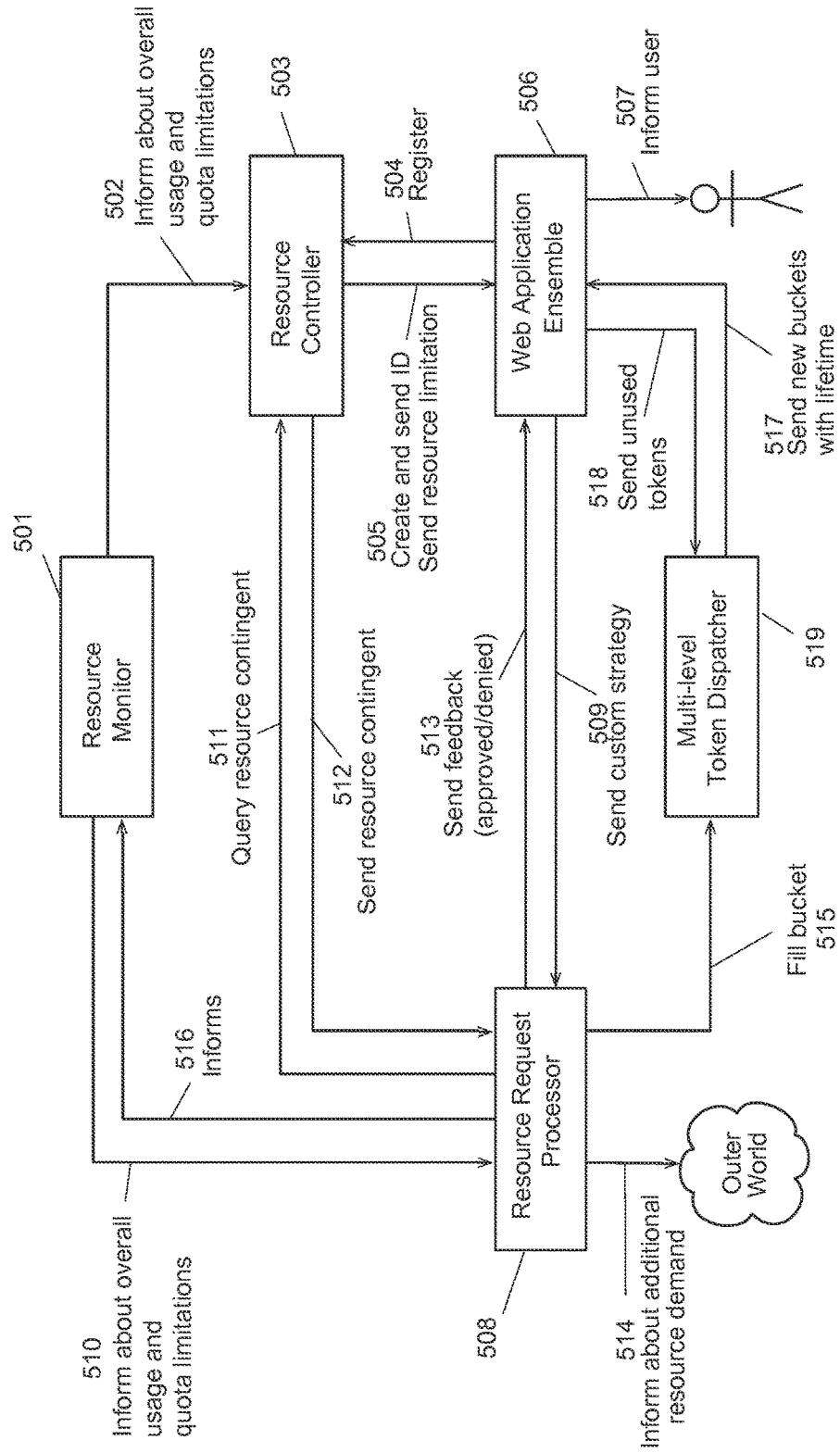
FIG. 5 is a block diagram of a resource control system, in accordance with certain example embodiments.

FIG. 5 is a block diagram of the resource control system 500, in accordance with certain example embodiments. Resource control system 500 includes a resource monitor 501, a resource controller 503, a web application ensemble 506, a resource request processor 508, and a multi-level token dispatcher 519. FIG. 5 also illustrates various interactions and information flows associated with components of the resource control system 500.

The resource monitor 501 operates to track down the overall usage of available resources, e.g., CPU cores, memory usage, network bandwidth, etc. The resource monitor 501, or a part thereof, can be realized as a standard monitoring component such as, for example, a Nagios™ plugin. The tracked resources may include all or a subset of the resources that is controllable (e.g., that can be use limited) by resource control system 500.

The resource monitor 501, by transmitting a message 502, informs resource controller 503 about current system usage. For example, message 502 may include data regarding overall usage of the system 500 and quota limitations. Additionally, by transmitting a message 510, the resource monitor 501 also informs resource request processor 508 regarding overall system usage and/or quota limitations.

The resource controller 503 operates as a registry service for all client applications and/or services 506. Client applications and/or services 506 may include, for example, a web application ensemble having a plurality of web application instances competing for resources controlled by resource control system 500. Client application components such as the leader of a scalable web application ensemble operate to register themselves by transmitting a message 504 to resource controller 503. Upon registering the web application or service, the resource controller 503 returns a message 505 to the web application an identifier and information regarding the potentially available resources. The received information can be used by the web application or service to perform a first determination as to whether a request to register a strategy in the resource request processor 508 could be realistically achieved. If there is a need for further resources that are currently unavailable, then the user is informed 507 by the web application with, for example, a suggestion to buy a premium account that fits his/her needs. This could, for instance, be realized as a pop-up window that requests tenant administrator credentials for conforming a binding order, by forwarding the user to an online shop, and/or the like.

The resource request processor 508 receives a message 509 including a strategy and evaluates the feasibility of this request by evaluating the data it has received from the resource monitor in message 510. In order to determine the status of the tenant for whom the resource request is made, the resource request processor 508 queries the resource controller 503 about the resource contingent possibly available for this tenant in a query 511. A response 512 specifying the possible resource contingent is then received at resource request controller 508 from resource controller 503.

The resource request processor 508 then makes a determination regarding the resource request, and provides feedback 513 to the web application 506 indicating whether the strategy proposed at 509 is approved or denied. If the strategy was declined, the resource request processor 508 calculates the additional needs and sends this information back to the client. If the request can be realized, even though currently there are not enough resources available, the resource request processor 508 informs 514 the infrastructure (e.g., a cloud controller agent) about additional needs for resources. If the resources cannot be allocated directly, the client may be informed about the estimated timeframe after which the request could be fulfilled and the estimated timeframe on when the bucket will be sent.

Thereafter, the resource request processor 508 informs 515 the multi-level token dispatcher service about the new bucket and when it will be activated, e.g., as soon as the demanded resources are available. The resource request processor 508 also informs 516 the resource monitor 501 about the new usage of the resources allocated by this request. If the request was accepted, the client web application is informed 517 regarding the assigned bucket with a predefined lifetime by the multi-level token dispatcher service 519. If the request was declined, the web application may be informed, for example, in a message 513, with detail about the cause. With this information, the web application can optionally inform the customer and propose a premium account according to the requested resources or send a re-request with lower requirements (e.g., a minimum amount of one or more resources required). The server component could proactively propose alternative strategies, e.g., "quickest possible" or "cheapest possible" strategies, to the user. The user could then pick the most suitable one from the proposed list. As soon as the operation is completed, unused tokens may be sent back, for example, using messages 518, to the multi-level token dispatcher service.

According to an example embodiment, the resource control system 500 is implemented such that some components include a separate module with client components taking care of the distributed, multi-tenant aware token bucket management. An example implementation may use at least the following components: the resource monitor tracking the usage and quota limitations of the cloud environment; the resource controller that keeps track of each component using the resources with a registered strategy; the multi-level token dispatcher client embedded in each web application that is part of a web application ensemble; the resource request processor that determines the quantity of resources a client web application can consume given the current strategy, or if it can be allocated, e.g., if certain requirements, such as premium account, are given; and the multi-level token dispatcher service.

Example interactions that occur among components of the resource management system 500 when resources are requested and allocated to a web application ensemble were discussed above in relation to FIG. 5. However, additionally, in a distributed cloud environment, it may be necessary or desirable to synchronize a resource limitation across multiple server instances (e.g., web application instances).

Figure 6:
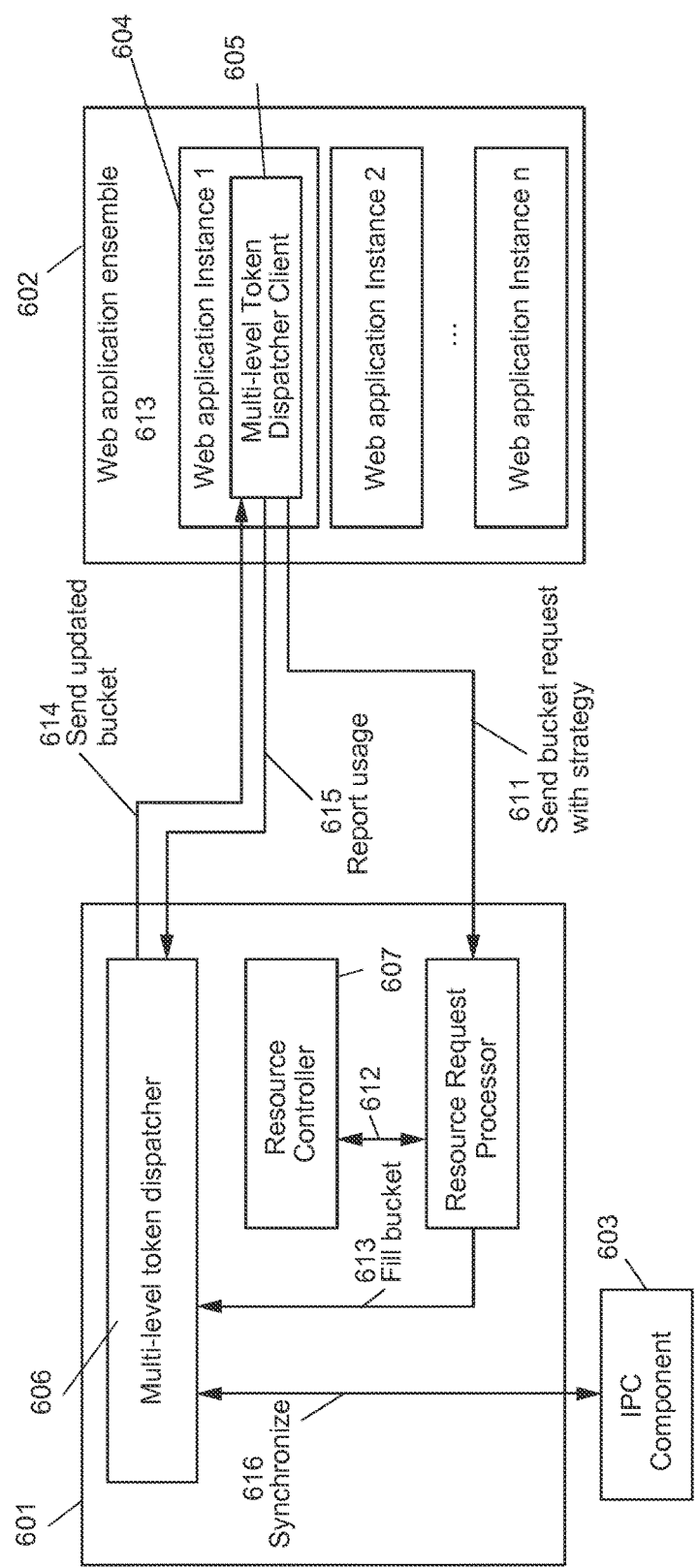
FIG. 6 illustrates a technique of token management in a distributed environment, according to certain example embodiments.

A technique of token management in a distributed environment according to certain example embodiments is depicted in FIG. 6. FIG. 6 illustrates, among other things, the interaction between a server part 601 of a resource control system and a web application ensemble 602. The interactions include interactions between a server component 606 and a client component 605 of the multi-level token dispatcher in order to update and synchronize token buckets among all instances of the web application.

Consider a document management application including several web application instances shown as web application ensemble 602 comprising web application instance 1, 2, . . . , n. The web application instances may be identical in terms of configuration. If a user requests a document download, then his/her requests is handled by one of the application instances (e.g., web application instance 604) and it may not be predictable as to which instance receives the request. In order to facilitate the requested operation in a distributed cloud environment, all instances may be synchronized in terms of token buckets of each user and tenant. If one of the instances receives a request that is to be resource limited, e.g., document download, then at operation 611 the multi-level token dispatcher client 605 inside the application instance 604 requests a token bucket at the request resource processor 608. The multi-level token dispatcher client 605 is a client component available in each web application instance that handles the communication with the multi-level token dispatcher server component 606. The processor 608 at operation 613 requests resources from the resource controller 607 and, at operation 613, fills the particular tenant bucket at the multi-level token dispatcher 606. The dispatcher 606 at operation 614, in turn, provides the bucket to the requesting web application instance 604. The web application instance consumes buckets from the user and, at operation 615, informs the token dispatcher 606 about the consumption until the request has been served. The dispatcher 606 at operation 616 synchronizes the token usage with all the other web application instances in the application ensemble 602, blocking the user bucket using an inter-process communication (IPC) component 603. The user bucket is unlocked after the request has finished.

Figure 7:
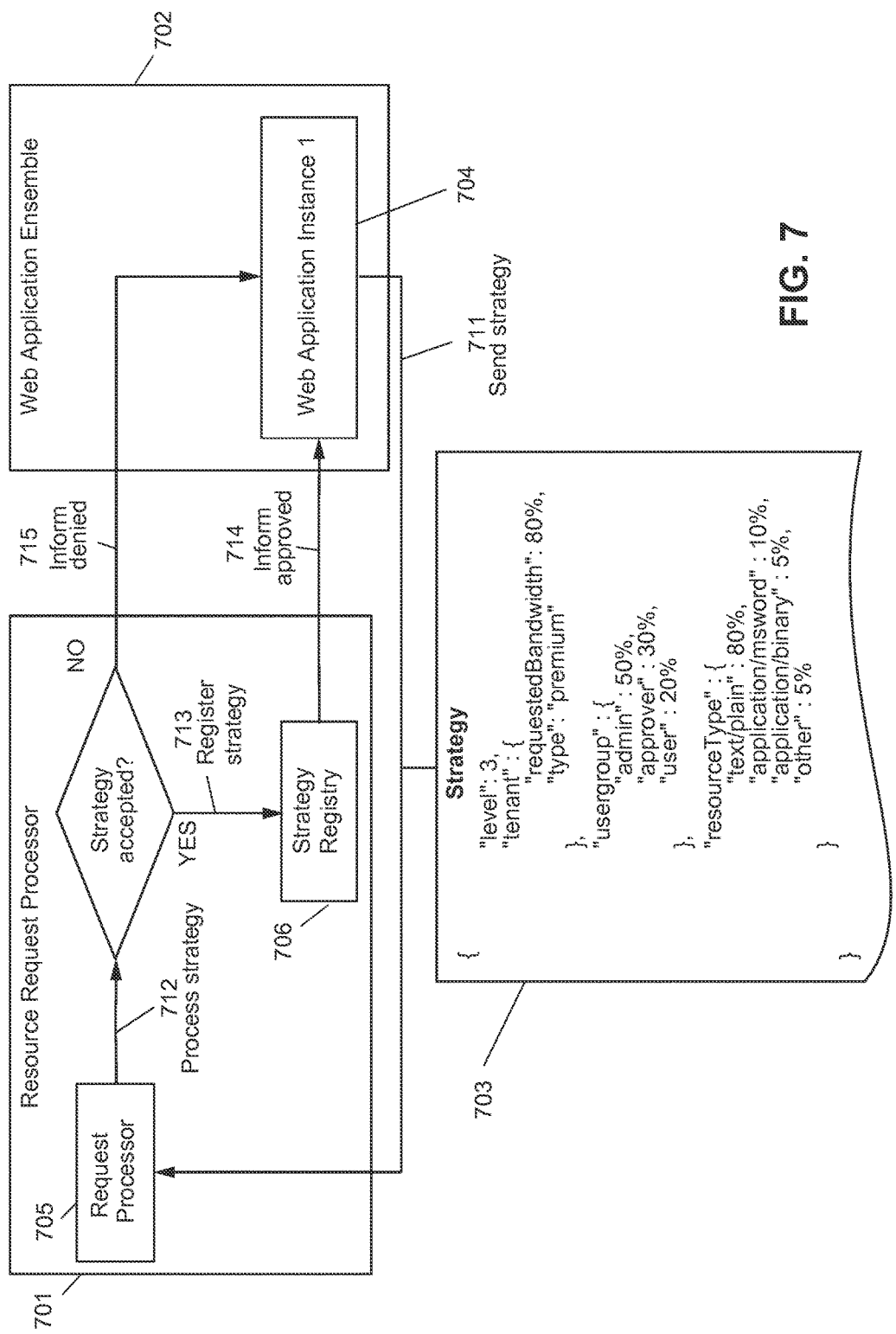
FIG. 7 illustrates interactions between a web application ensemble and a server component with respect to processing a resource strategy, according to certain example embodiments.
Figure 8:
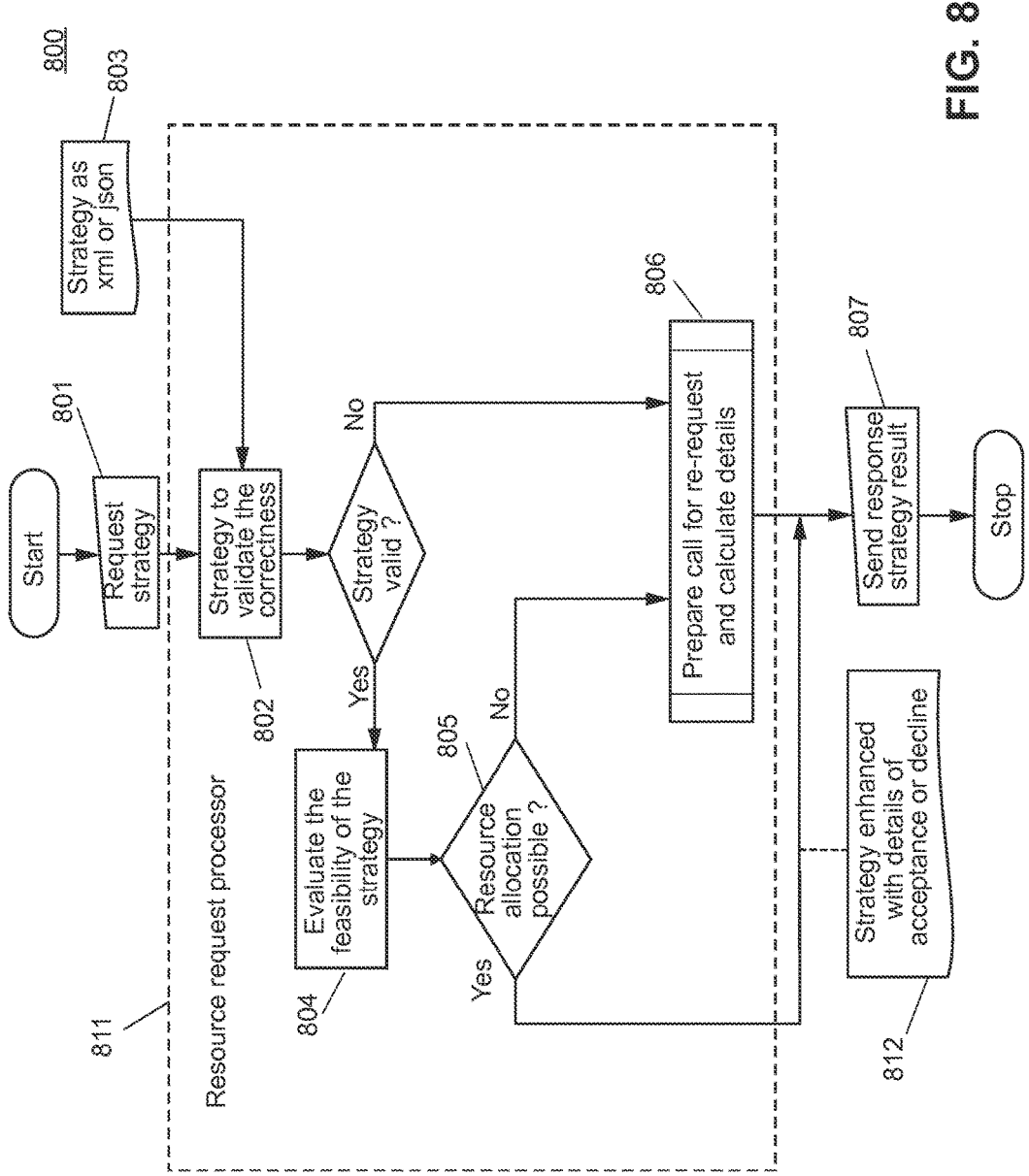
FIG. 8 illustrates a process to configure a resource strategy performed by a resource control server, in accordance with certain example embodiments.
Figure 9:
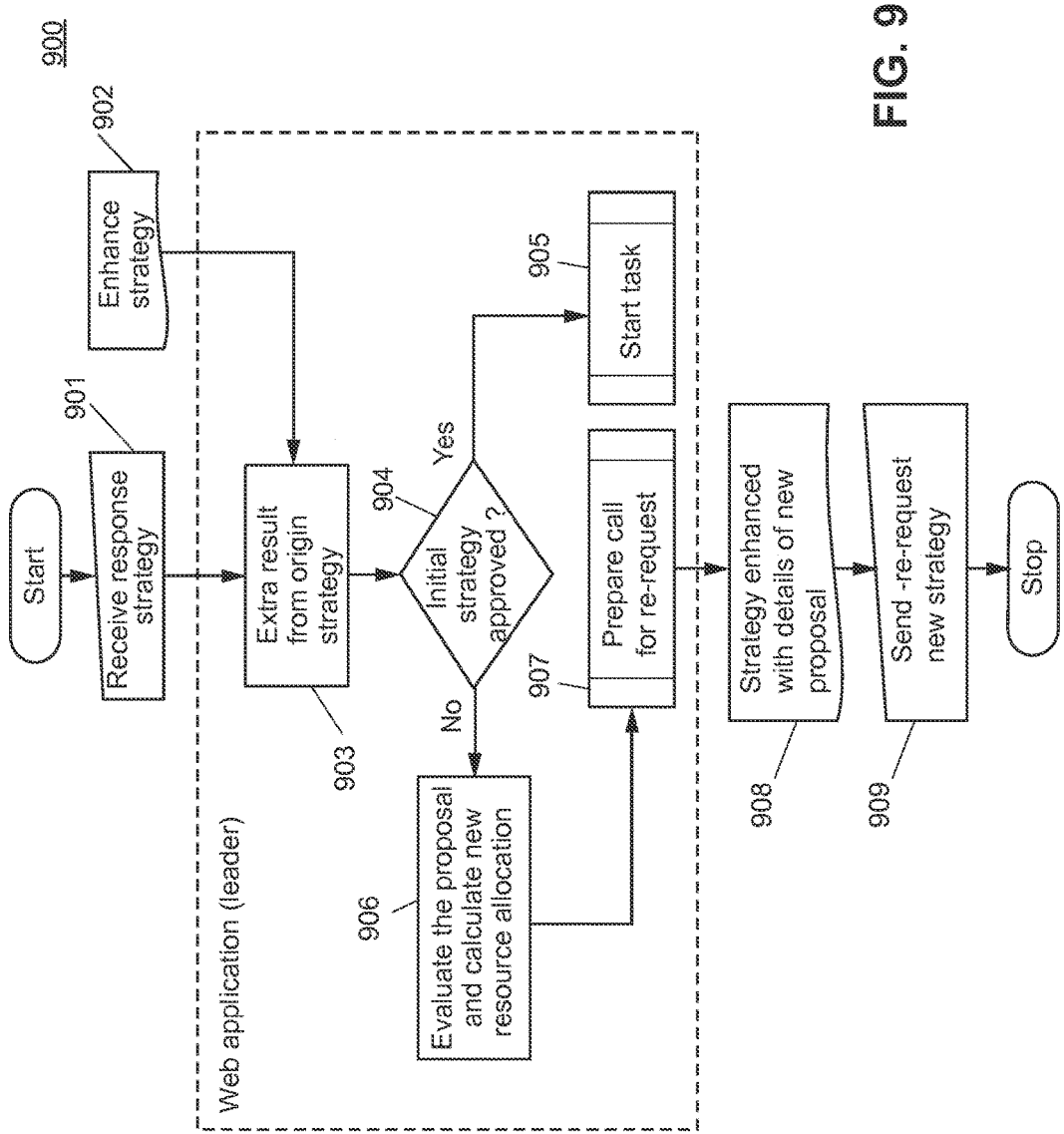
FIG. 9 illustrates a process to configure a resource strategy as performed by a web application instance, in accordance with certain example embodiments.

A more detailed process of token management according to certain example embodiments is illustrated in FIGS. 7-9. A leader election process is used to determine the leading web application instance in the ensemble. In distributed computing, leader election is the process of designating a single process from a group of processes as the organizer of some task distributed among the group. There a several algorithms for determining a leader, such as, for example, the Chang and Roberts algorithm, a ring-based election algorithm, etc. Any suitable approach may be used in example embodiments.

FIG. 7 illustrates interactions between a web application ensemble 702 and a server component 701 with respect to processing a strategy 703. The strategy 703 for requesting resources is sent at operation 711 from the elected leader 704 of the web application ensemble 702 to the resource request processor 705. A strategy, such as strategy 703, may be a generic data structure that defines the detailed resource request in the form of a multi-layered description. This description could be sent as, e.g., an XML or JSON document, or other format that is suitable for such resource requirement specification. The representation of the strategy may provide the ability to enhance each layer in every dimension (e.g., per tenant, per user, etc.).

The strategy enables the resource use limitation system to assure a detailed resource allocation in a multi-tenant cloud environment in respect to the demands of a service and the available resources. The resource request processor 705 checks the provided strategy 703 for correctness. After this correctness validation, the strategy is processed at operation 712, and it is determined if the request for resources within this strategy could be realized for this tenant. If it is determined that sufficient resources can be allocated, then at operation 713 the strategy is registered at the strategy registry 706, and the requester 704 is informed of this with a detailed message at operation 714. The detailed message may contain the original strategy annotated with details as to whether the resource request could be accepted or not.

In case of a declined strategy, at operation 715, the cause of the rejection enhanced with a new proposal that is feasible for the service and the tenant is sent back to the requester. The requester may react to the declined policy in different ways, e.g., by sending a re-request with lower requirements.

FIGS. 8 and 9 illustrate further details with respect to the interactions between a web application ensemble and a server component during a process for configuring a processing a strategy described in relation to FIG. 7. FIG. 8 illustrates a process 800 performed by a resource control server of the resource control system in order to configure a strategy as described in relation to FIG. 7.

Process 800 may begin when the resource control system server at operation 801 requests the web application ensemble (e.g., a leader of the ensemble) to provide a strategy. In response to the request, a strategy 803 may be provided by the web application ensemble to the resource control system server. In certain example embodiments, the resource control system server may not perform operation 801, and the strategy 803 may be provided to the resource control system server by the web application ensemble without a request from the resource control system server.

At operation 802, the resource control system server or the resource request processor 811 of the resource control system server validates the strategy for correctness. The validation may include checks for proper syntax and valid resource requests.

If the strategy is valid, at operation 804, the feasibility of the strategy is determined. The feasibility determination includes, at operation 805, a determination as to whether resource allocation for the strategy is possible. The feasibility determination may include determining at each level (e.g., user level, tenant level, global) whether the required resources are available for use by the user. In addition to determining whether the raw capacity in the requested resource(s) is/are available, it is also determined whether the provision of the requested resources would be consistent with the user and/or tenant's service level agreements and also service agreements of other tenants.

If it is determined that resource allocation for the strategy is indeed feasible, then a response optionally including the strategy enhanced with details of acceptance 812 is sent to the web application ensemble at operation 807. For example, the enhancements may include annotations with respect to the amount of actual availability of one or more resource at the user and/or tenant level.

If it is determined at operation 805 that the resource allocation for the strategy is not feasible, or if it determined at operation 803 that the strategy is invalid, then process 800 proceeds to operation 806.

At operation 806, a call for a re-request is prepared. Optionally, the resource request processor 811 may include calculated details as to available resources, etc., in the prepared call. After operation 806, at operation 807 a response to the proposed strategy is provided to the web application ensemble.

After operation 807, process 800 may terminate.

FIG. 9 illustrates a process 900 performed by web application instance in order to configure a strategy as described in relation to FIG. 7. Specifically, process 900 may be performed by the leader of a web application ensemble when it receives a response from the resource control system server regarding a submitted strategy.

Process 900 may begin at operation 901 when the web application ensemble receives a response from the resource control system server regarding an already submitted strategy. A response may include an annotated strategy 902 provided by the resource control system server. For example, the annotations may contain the detailed information if a request was declined by the resource request processor.

At operation 903 the received response is processed to extract the result with respect to the submitted strategy. The processing may include determining, at operation 904, whether or not the submitted strategy has been approved. If it is determined at 904 that the submitted strategy has been approved, then at operation 905 the one or more tasks for which the resource request was made is started, and process 900 may thereafter terminate.

If it is determined at 904 that the submitted strategy has not been approved (e.g., has been declined), then a new strategy is calculated at operation 906. The calculation of the new strategy may take into account any of, current resource information and/or resource allocation counter proposals provided in the response, and/or any information the web application ensemble has regarding resource requirements. If the previously sent strategy is declined, according to certain example embodiments, the client module, namely the multi-level token dispatcher client, evaluates the new proposal from the server side and decides if it could be accepted, or calculates a new proposal with, for example, fewer resource requirements, or it decides to enable a premium account and resend the original request.

At operation 907, the re-request strategy (e.g., a new adopted strategy) is prepared. The preparation may include enhancing the strategy with details of the new proposal at operation 908. At operation 909, the new strategy is sent to the resource control system server in the re-request. The re-requesting could be repeated until an agreement between the requested service and the resource request controller is accomplished and the request for resources could be fulfilled. When this is the case and a request can be fulfilled, the strategy is registered at the strategy registry to calculate new request. The strategy remains valid until the request of a service is terminated or the resource controller interrupts, e.g., because of a new resource situation within the cloud infrastructure.

Figure 10:
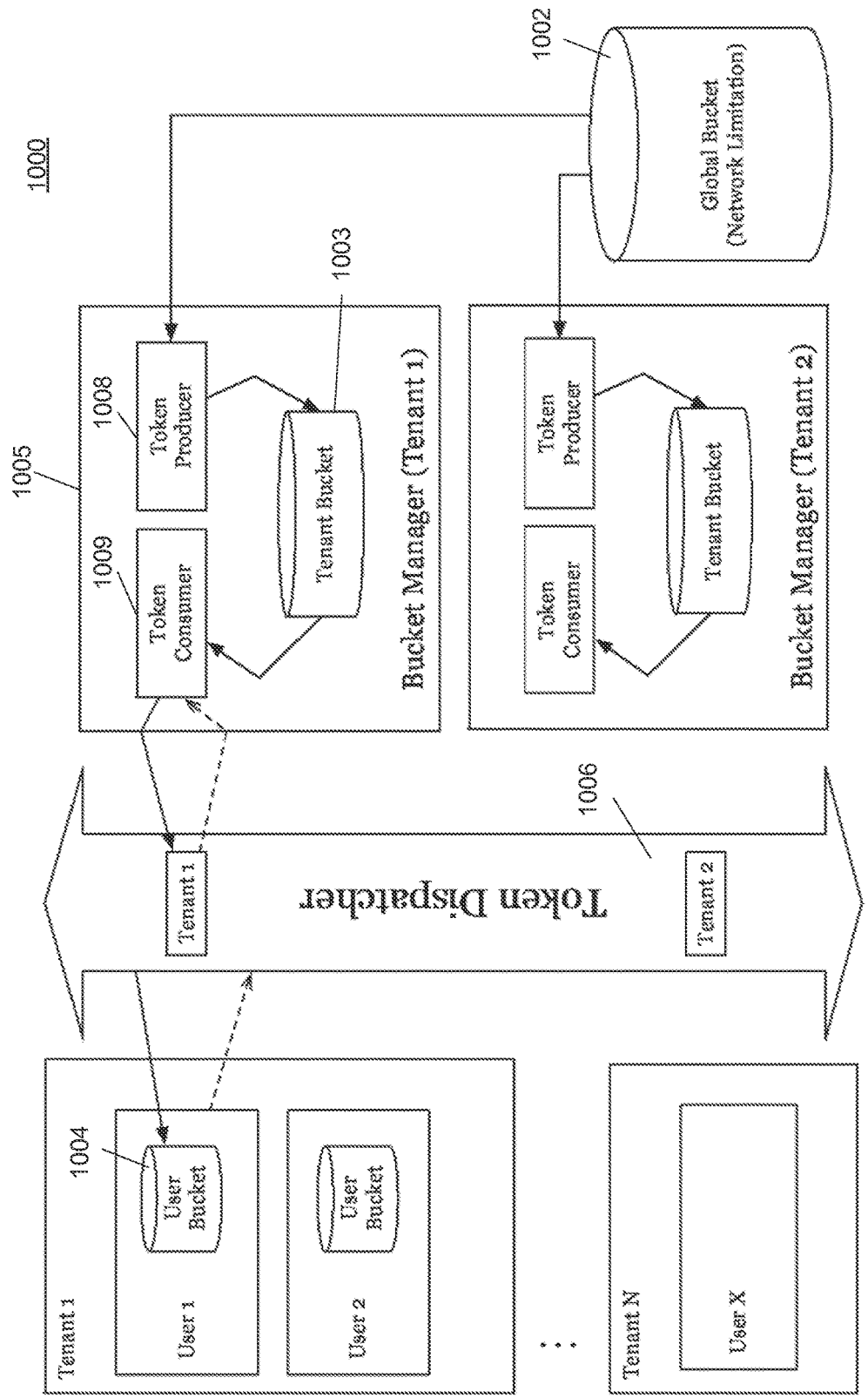
FIG. 10 illustrates a block diagram of a multi-level token dispatcher, in accordance with certain example embodiments.

FIG. 10 is a block diagram illustrating a multi-level token dispatcher 1000, such as multi-level token dispatcher 519, according to certain example embodiments. The multi-level token dispatcher 1000 includes a global token bucket 1002, a tenant token bucket 1003 for each tenant, and a user token bucket 1004 for each user. The multi-level token dispatcher 1000 also includes a bucket manager 1005 and a token dispatcher 1006. The bucket manager 1005 operates to manage the user and tenant buckets by performing, for example, managing of the filling and consuming rates for each bucket in respect to other tenants and/or users working at the same time. The bucket manager 1005 includes a token producer 1008 and a token consumer 1009. The token dispatcher 1006 operates to distinguish between the different buckets and deliver the tokens at the user level. The token producer 1008 operates to retrieve tokens from the global bucket and put them into tenant-level buckets, and also to return left-over tokens into global bucket. The token consumer 1009 operates to retrieve tokens from the tenant-level bucket and put them into user-level buckets, and to also return left-over tokens into tenant-level bucket.

Figure 11:
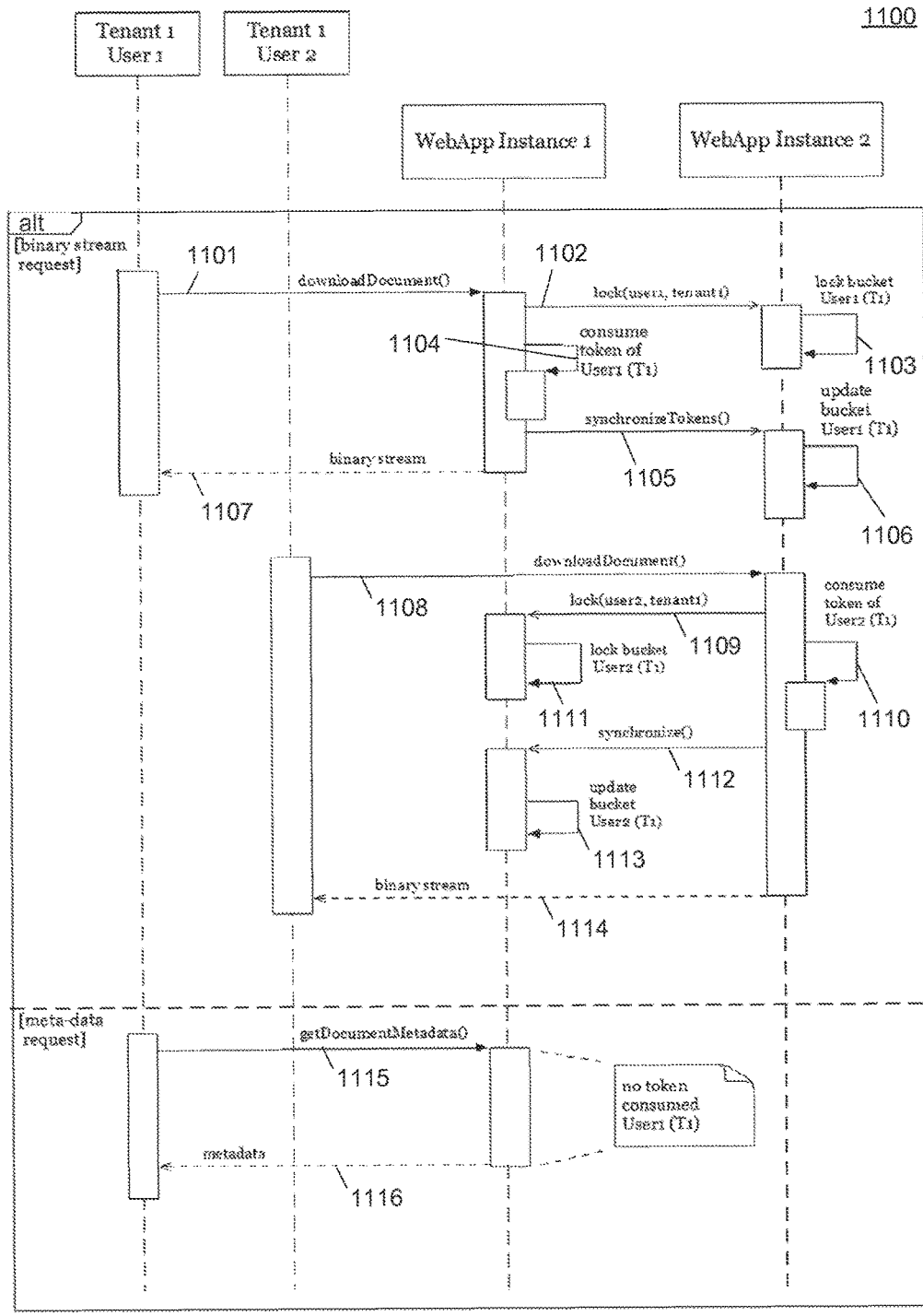
FIG. 11 is an activity chart illustrating a token acquisition technique in accordance with certain example embodiments.

FIG. 11 shows an activity chart 1100 illustrating the token acquisition technique, according to certain example embodiments. Activity chart 1100 illustrates the interactions between tenant 1 user 1, tenant 1 user 2, web application instance 1, and web application instance 2, in relation to token acquisition. When a server (e.g., an instance of a web application, web application instance 1) receives a resource limiting relevant request (e.g., request to download document that would affect the resource limitations for other users and/or tenants) at operation 1101, the server receiving the request takes the leadership for this request and initiates the token acquisition process. The determination as to whether the received request is a resource limiting relevant request is made by the web application instance that receives the request. At first, the receiving web application instance notifies all other web application instances (e.g., web application instance 2) about the request at operation 1102 by locking the bucket of the user (e.g., tenant user 1) that started the request. In the illustrated embodiment, upon receiving the request 1102 to lock from web application instance 1, web application 2 at operation 1103 locks the token bucket for tenant 1 user 1. As long as the bucket is locked, the user will not be able to complete any requests on the other service instances. Once it has successfully locked the bucket, it starts consuming tokens from the bucket until the request has completed (operation 1104). The number of consumed tokens is propagated at operation 1105 to all web application instances in order to synchronize the token buckets among all the web application instances and the user bucket is unlocked after the request has finished (e.g., the requested download is complete when the binary stream is returned to tenant 1 user 1 at operation 110). All web application instances update their buckets at operation 1106 in compliance with the information provided by the leading web application instance. According to an embodiment, all the buckets are filled again at a predefined, fixed rate. This happens at all the instances simultaneously and, therefore, it does not matter which instance handles the next request by the user.

Operations 1108-1114 illustrate the interactions when tenant 1 user 2 requests a document download. The request at operation 1108 is received by web application instance 2. The web application instance 2 requests at operation 1109 for the other web application instance, web application instance 1 to lock the token bucket of tenant 1 user 2. Accordingly, web application instance 1 at operation 1111 locks the token bucket. At operation 1110, web application instance 2 consumes tokens from the bucket of tenant 1 user 2, and at operation 1112 informs the other web application instance to synchronize the bucket for tenant 1 user 2. The other web application instance performs the update of the bucket at operation 1113.

At operation 1115, the tenant 1 user 1 makes a request for metadata. Upon receiving the request, web application instance 1 determines that the received request is not a resource limiting relevant request and consequently does not initiate the resource limiting process. For example, returning the requested metadata may be a short duration operation. Consequently no tokens are consumed. A reply to the request is provided at operation 1116, to complete the sequence of operations commenced at 1115.

Figure 12:
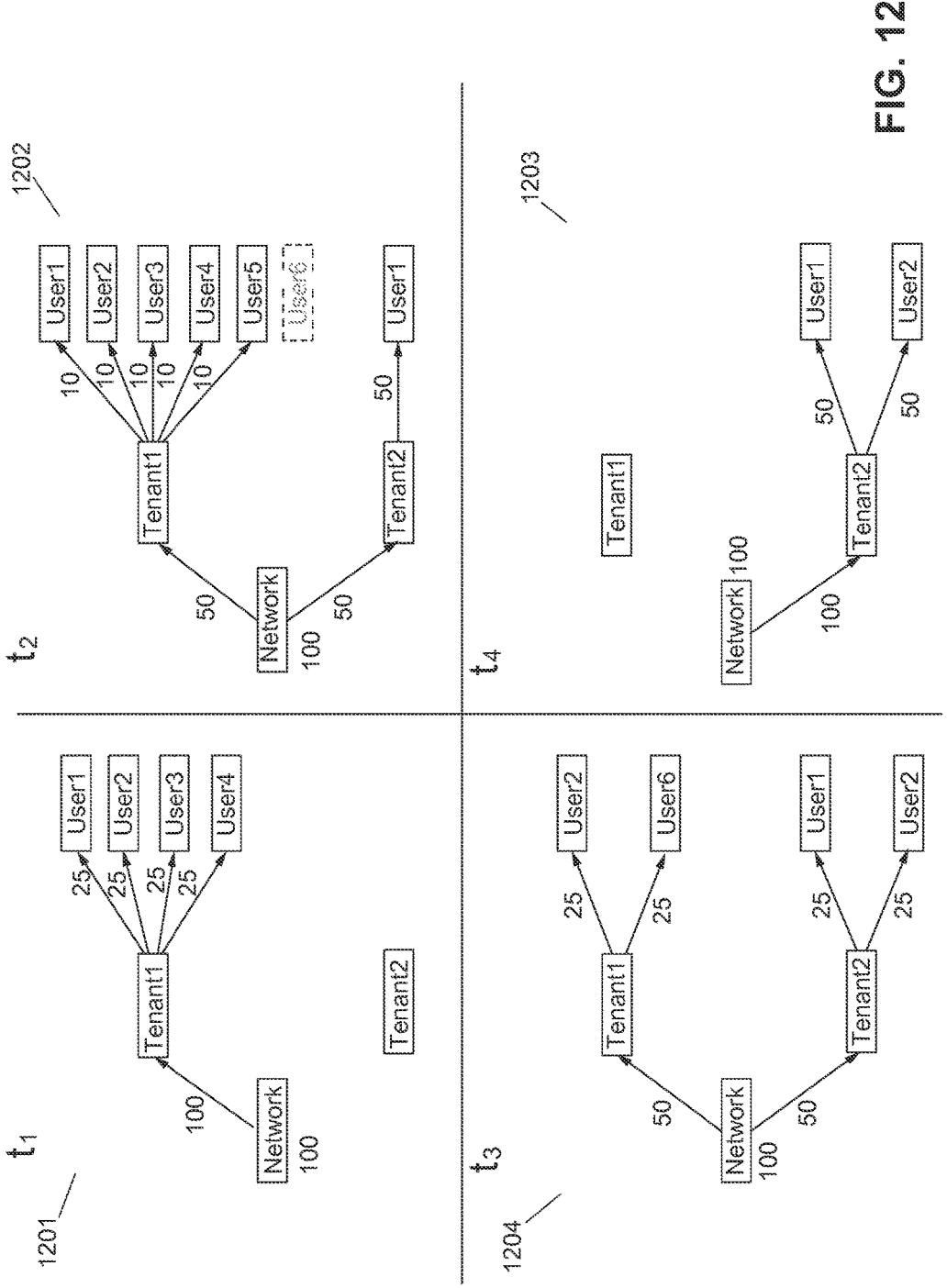
FIG. 12 illustrates example fair token distributions, in accordance with certain example embodiments.
Figure 13:
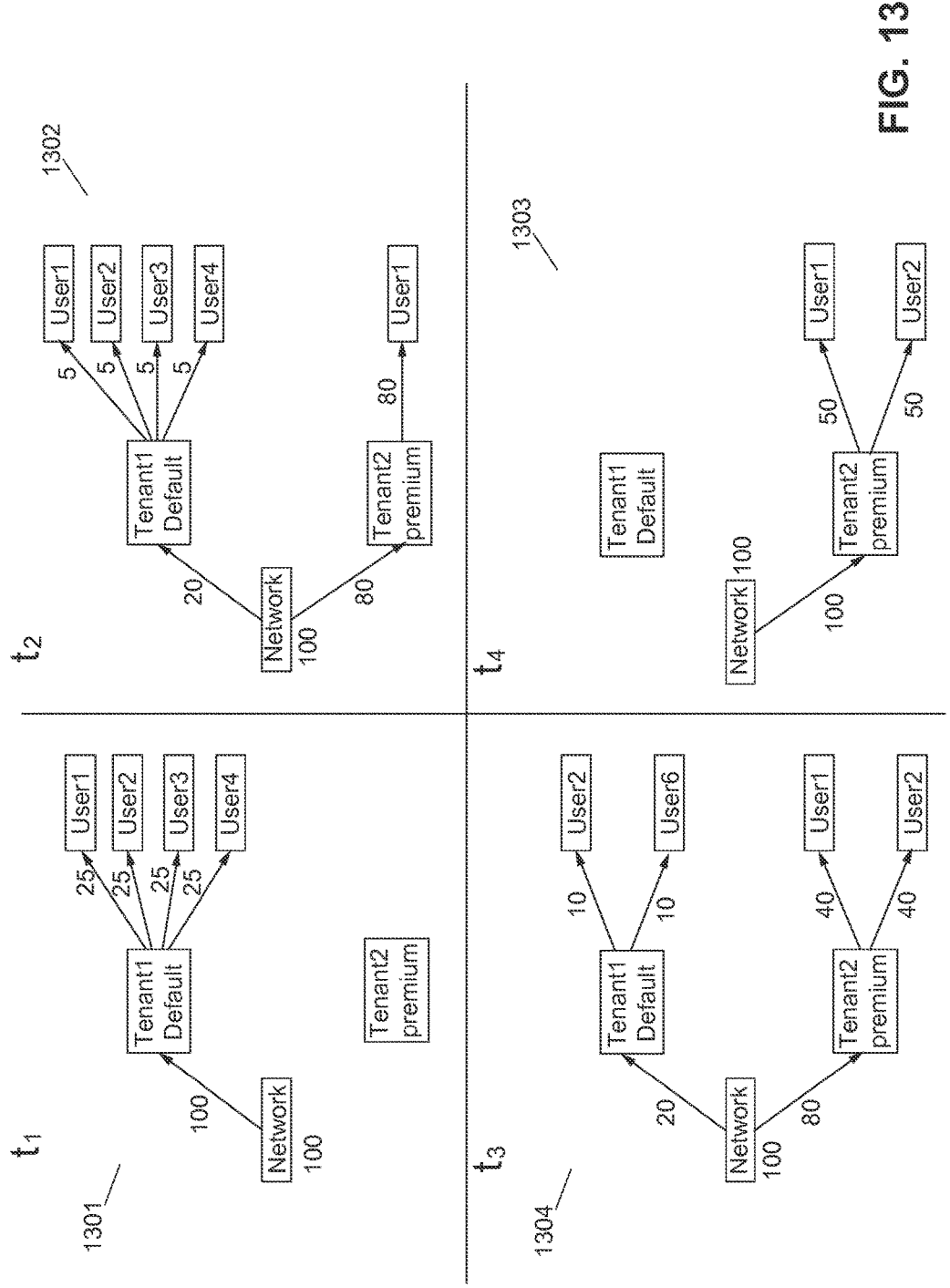
FIG. 13 illustrates example unfair token distributions in accordance with certain example embodiments.

As described above, the token buckets are usually filled equally and refilled at a constant rate. The tokens available in the global bucket are shared equally amongst all active tenants and the tokens available in the tenant buckets are shared equally amongst all active users of a tenant. FIG. 12 illustrates how 100 tokens of the global bucket (e.g., network) is distributed fairly between tenants and users at four different time instances 1201 at $t_1$, 1202 at $t_2$, 1203 at $t_3$, and 1204 at $t_4$. While this (e.g., fair distribution) approach might be sufficient in most situations, there might still be a need for "unfair" distribution of tokens as shown in FIG. 13. In this situation, some tenants are eligible to receive a higher number of tokens per time period compared to the other tenants, e.g., because they bought a premium service. For example if there is only one active tenant without premium service, then his/her bucket may be filled with 100 tokens, which in this example represents the full capacity of the global bucket. As soon as a second premium tenant becomes active, the bucket of the premium tenant will be filled with 80 tokens and the bucket of the standard tenant will be filled with 20 tokens only. FIG. 13 illustrates how 100 tokens of the global bucket (e.g., network) is distributed unfairly between tenants and users at four different time instances 1301 at $t_1$, 1302 at $t_2$, 1303 at $t_3$, and 1304 at $t_4$.

Figure 14:
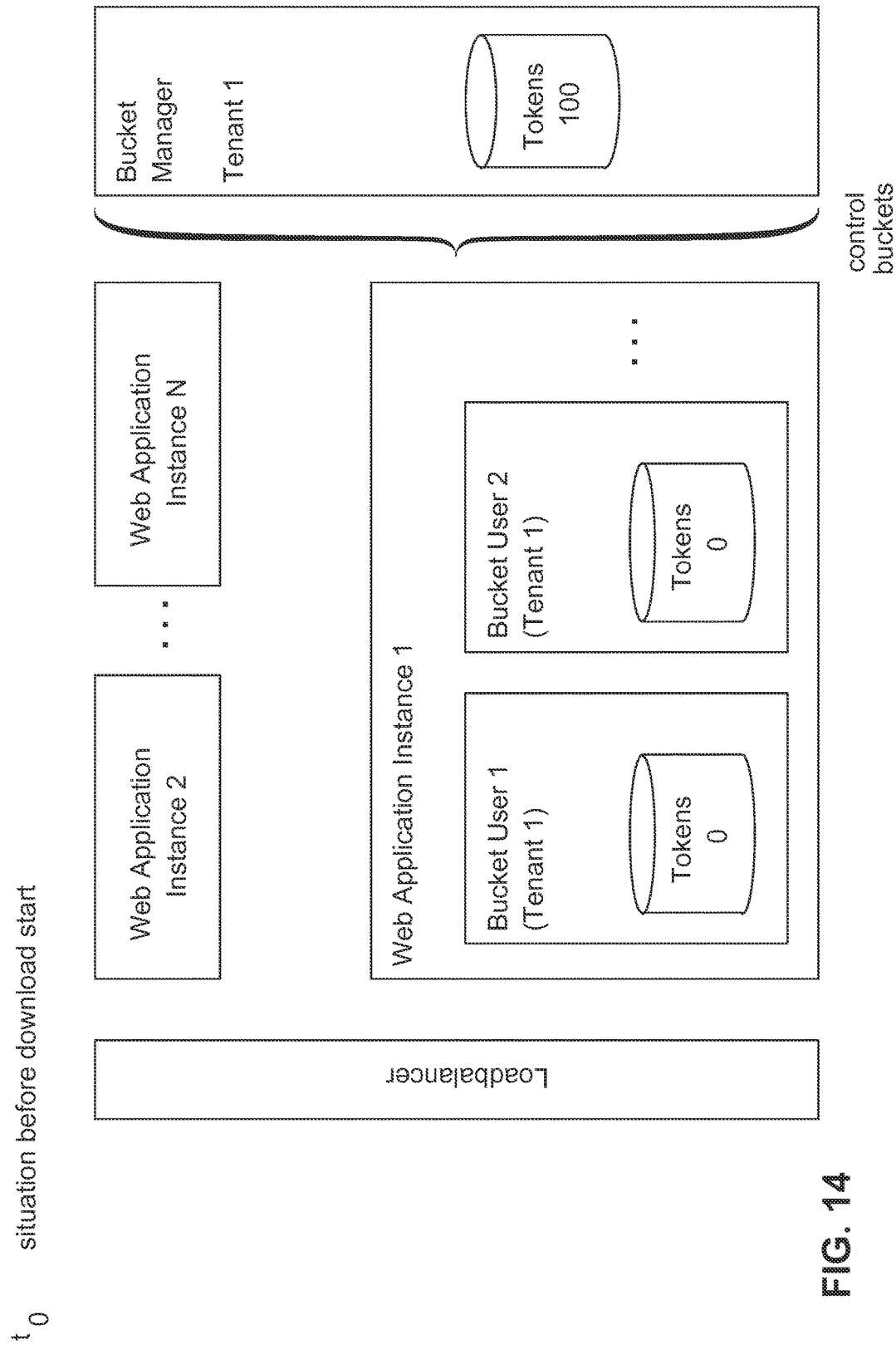

FIGS. 14-16 depict an example token acquisition scenario. FIG. 14 illustrates at time to before the first requests in a time period, the bucket of each active tenant is filled up to its maximum capacity. The only active tenant is tenant 1. As illustrated in FIG. 15, at time $t_1$ when the first requests for service arrive, for example, a document download request from user 1 of tenant 1, the tokens available in the tenant bucket are distributed amongst all active users (e.g., users 1 and 2 of tenant 1). In the example, web application instance 1 receives the request, and locks the user 1 bucket at all other web application instances. Tokens are consumed during servicing of the request. As an example of resource limitation, one can think of a network bandwidth limitation while working with documents via a document management system. Another example is a resource limitation for RAM and/or CPU usage, e.g., for long running report execution that needs a lot of resources. This resource limitation enables planning reliability for premium tenants by preferring this tenant in respect to the account level, e.g., by queuing the tasks of default tenants to a later time. The same could be realized with scheduled tasks. Another example is a time and resource intensive simulation or any other long running task. As illustrated in FIG. 16, when the request servicing is complete (e.g., the document download is complete), some tokens have been consumed from user 1's bucket in the web application instance 1. The information about consumed tokens is propagated to the other instances to synchronize the buckets after completion of the request Although certain example embodiments have been described in connection with Java and like languages, it will be appreciated that these languages are merely examples and may or may not necessarily correspond to a programming language that is used (or is to be used) in a real system or all embodiments of this invention. Instead, it will be appreciated that the example techniques described herein are not dependent on any specific programming language and/or runtime environment.

A description of certain terms is provided below for aiding in the understanding of how certain example embodiments may operate. However, it is to be understood that the following descriptions are provided by way of example for explanatory purposes and should not be construed as being limiting on the claims, unless expressly noted.

| Term | Example Description |
| --- | --- |
| Multi-level token dispatcher | Distinguishes between the different buckets and delivers the tokens at the user level. |
| Multi-level token dispatcher client | Client component embedded in each web application using the token bucket mechanism. |
| Resource controller | Keeps track of each component using the resources with a registered strategy. |
| Resource monitor | Tracks usage and quota limitations of the whole cloud environment. |
| Resource request processor | Determines how many resources a client web application can consume given the current strategy. |

-continued

| Term | Example Description |
| --- | --- |
| Strategy | Generic data structure that defines the detailed resource request in form of a multi-layered description. |
| Strategy Registry | Keeps track of the registered strategies. |
| Token dispatcher | See multi-level token dispatcher. |
| Token consumer | Retrieves tokens from the tenant-level bucket and puts them into user-level buckets. |
| Token producer | Retrieves tokens from the global bucket and puts them into tenant-level buckets. |
| Web application ensemble | Cluster of one or more equal web application instances. |
| Web application leader | One instance of the web application ensemble serving the requests. |

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for limiting usage of resources in a distributed computing environment that is configured to execute a plurality of application processes that are each associated with a first tenant account of tenant accounts of the distributed computing environment, where each unit of the resources of the distributed computing environment is represented as a token and the plurality of application processes are configured to consume tokens in correspondence with usage of the resources of the distributed computing environment, the method comprising:

configuring a hierarchy of token buckets, the hierarchy having at least three levels, with a first level corresponding to the distributed computing environment, a second level corresponding to the tenant accounts, and a third level corresponding to users, which include a plurality of users that belong to the first tenant account, of the distributed computing environment;

receiving, at a first application process of the plurality of application processes, a service request from a user of the plurality of users;

generating, as part of the first application process, a resource strategy based on the received service request, the resource strategy specifying at least one resource shared by the plurality of application processes of the first tenant account and an amount of the at least one resource for use by the first application process to subsequently perform a service requested in the service request;

communicating the resource strategy to a resource controller process that is executing on the distributed computing environment, the resource controller process being different from the first application process and not among the plurality of application processes that are associated with the first tenant account;

obtaining, with the resource controller process, resources of the distributed computing environment that are available for the first tenant account and associated with a bucket of the hierarchy of token buckets;

determining, by using the resource controller process and based on the obtained resources, whether the generated resource strategy is feasible;

sending, from the resource controller process to the first application process, a response result message based on the determining, where contents of the response result message include a feasibility indication of the generated resource strategy; and based on contents of the response result message, selectively:
  (a) based on the contents of the response result message indicating the resource strategy is feasible, performing the service in the first application process in accordance with the resource strategy initially generated as part of the first application process,
  (b) based on the contents of the response result message indicating the resource strategy is not feasible, revising the resource strategy and re-submitting, by using the first application process, the revised resource strategy to the resource controller process wherein (a) performing the service in the first application process further includes:
  (1) locking the third level token bucket of the user that submitted the service requesting, the lock preventing consumptions of tokens for all other ones of the plurality of application processes that are not the first application process, and
  (2) while the third level token bucket of the user is locked for all other ones of the plurality of application processes that are not the first application process, using the at least one resources to carry out the service request for the first application process in accordance with consumption of tokens in the third level token bucket for the first user.

2. The method according to claim 1, further comprising:
ensuring revision of the resource strategy and re-submitting by one of the plurality of application processes the revised resource strategy to the resource controller process; and
subsequent to a determination by the resource controller process that the revised resource strategy is feasible, performing the service in accordance with the revised resource control strategy.

3. The method according to claim 1, further comprising:
distributing the tokens in accordance with a predetermined allocation of the at least one resource to a plurality of users,
wherein a total number of tokens that can fill a token bucket in the hierarchy of token buckets corresponds a maximum capacity of the at least one resource,
wherein the determining feasibility of the resource strategy is based on a number of tokens in a token bucket corresponding to the user that submitted the service request.

4. The method according to claim 1, further comprising:
performing the service and consuming a number of said tokens corresponding to the amount of the at least one resource used for the service from the user level token bucket corresponding to the user of the service request.

5. The method according to claim 4, wherein the performing of the service comprises:
synchronizing the user level token bucket corresponding to the user at others of the plurality of application processes to update a status of the user level token bucket corresponding to the user after the use, wherein the updated status includes reducing a number of tokens in the user level token bucket corresponding to the user by a number of the consumed tokens.

6. The method according to claim 4, wherein the determining comprises determining that a number of tokens in the user level token bucket corresponding to the user equals or exceeds a number of tokens corresponding to said amount of the at least one resource for use by the first application process.

7. The method according to claim 6, wherein the determining further comprises determining that the user level token bucket corresponding to the user is not locked by another of the plurality of application processes.

8. The method according to claim 4, wherein the distributing includes distributing the tokens in accordance with a predetermined allocation of the at least one resource to said each tenant account and said plurality of users.

9. The method according to claim 1, wherein the determining includes determining by the resource controller process different from the first application process that the generated resource strategy is not feasible, and wherein method further comprises:
annotating the generated resource strategy to include information regarding an amount available of the at least one resource;
returning, by the resource controller process to the first application process, the annotated resource strategy;
revising the generated resource strategy based on the annotated resource strategy; and
re-submitting the revised resource strategy to the resource controller process.

10. The method according to claim 9, wherein the revising comprises specifying a reduced amount of the at least one resource, the reduced amount being determined based on an estimated minimum amount of the at least one resource required for the service.

11. The method according to claim 1, wherein the plurality of application processes includes different instances of a same application.

12. A system for limiting usage of resources in a distributed computing environment that is configured to execute a plurality of application processes that are each associated with a first tenant account of tenant accounts of the distributed computing environment, where each unit of the resources of the distributed computing environment is represented as a token and the plurality of application processes are configured to consume tokens in correspondence with usage of the resources of the distributed computing environment, the system comprising a plurality of processing systems communicatively connected by a network, each comprising at least one processor, the plurality of processing systems being configured to at least:
configure a hierarchy of token buckets, the hierarchy having at least three levels, with a first level corresponding to the distributed computing environment, a second level corresponding to the tenant accounts, and a third level corresponding to a plurality of users that are associated with the first tenant account, the plurality of application processes being executed by the distributed computing environment in association with the first tenant account;

receive, by a first application process of the plurality of application processes, a service request from a user of the plurality of users;

generate, as part of the first application process, a resource strategy based on the received service request, the resource strategy specifying at least one resource shared by the plurality of application processes of the first tenant account and an amount of the at least one resource for use by the first application process to subsequently perform a service requested in the service request;

communicate the resource strategy to a resource controller process that is executing on the distributed computing environment, the resource controller process being different from the first application process and not among the plurality of application processes that are associated with the first tenant account;

obtain, with the resource controller process, resources of the distributed computing environment that are available for the first tenant account and associated with a bucket of the hierarchy of token buckets;

determine, by using the resource controller process and based on the obtained resources, whether the generated resource strategy is feasible;

send, from the resource controller process to the first application process, a response result message based on the determination, where contents of the response result message include a feasibility indication of the generated resource strategy; and based on indication of the feasibility of the resource strategy in the response result message, selectively perform, by the first application process, one of:
  (a) the service in the first application process in accordance with the resource strategy when the determining determines that the resource strategy is feasible, and
  (b) revision of the resource strategy and re-submission, by using the first application process, of the revised resource strategy to the resource controller process when the determining determines that the resource strategy is not feasible, wherein (a) performing the service in the first application process further includes:
  (1) locking the third level token bucket of the user that submitted the service requesting, the lock preventing consumptions of tokens for all other ones of the plurality of application processes that are not the first application process, and
  (2) while the third level token bucket of the user is locked for all other ones of the plurality of application processes that are not the first application process, using the at least one resources to carry out the service request for the first application process in accordance with consumption of tokens in the third level token bucket of the first user.

13. The system according to claim 12, wherein the distributed computing environment is a multi-tenant cloud computing environment.

14. The system according to claim 13, wherein the performing includes revising the resource strategy and re-submitting by one of the plurality of application processes the revised resource strategy to the resource controller process, and subsequent to a determination by the resource controller process that the revised resource strategy is feasible, performing the service in accordance with the revised resource control strategy.

15. The system according to claim 13, wherein the plurality of processing systems is further configured to:
  perform the service and consume a number of tokens corresponding to the amount of the at least one resource used for the performed service from the user level token bucket corresponding to the user.

16. The system according to claim 15, wherein the processing systems are configured to perform the service by:
  synchronizing the user level token bucket corresponding to the user at others of the plurality of application processes to update a status of the user level token bucket corresponding to the user after the use, wherein the updated status includes reducing a number of tokens in the user level token bucket corresponding to the user by a number of the consumed tokens.

17. The system according to claim 13, wherein the processing systems are configured to determine, using the resource controller process different from the first application process, that the generated resource strategy is not feasible, and are further configured to:
  annotate the generated resource strategy to include information regarding an amount available of the at least one resource;
  return, by resource controller process to the first application process, the annotated resource strategy;
  revise the generated resource strategy based on the annotated resource strategy; and
  re-submit the revised resource strategy to the resource controller process.

18. A non-transitory computer readable storage medium having stored thereon instructions for use with a distributed computing environment that is configured to execute a plurality of application processes that are each associated with a first tenant account of tenant accounts of the distributed computing environment, where each unit of the resources of the distributed computing environment is represented as a token and the plurality of application processes are configured to consume tokens in correspondence with usage of the resources of the distributed computing environment, the distributed computing environment configured with a hierarchy of token buckets, the hierarchy having at least three levels, with a first level corresponding to the distributed computing environment, a second level corresponding to the tenant accounts, and a third level corresponding to a plurality of users that are associated with the first tenant account, the plurality of application processes being executed by the distributed computing environment in association with the first tenant account, the stored instructions comprising instructions that cause, when executed by at least one processor of a plurality of processing systems in a distributed computing environment, the plurality of processing systems to at least:

receive, by a first application process of the plurality of application processes, a service request from a user of the plurality of users;

generate, as part of the first application process, a resource strategy based on the received service request, the resource strategy specifying at least one resource shared by the plurality of application processes of the first tenant account and an amount of the at least one resource for use by the first application process to subsequently perform a service requested in the service request;

communicate the resource strategy to a resource controller process that is executing on the distributed computing environment, the resource controller process being different from the first application process and not among the plurality of application processes that are associated with the first tenant account;

obtain, with the resource controller process, resources of the distributed computing environment that are available for the first tenant account and associated with a bucket of the hierarchy of token buckets;

determine, by using the resource controller process and based on the obtained resources, whether the generated resource strategy is feasible;

send, from the resource controller process to the first application process, a response result message based on the determination, where contents of the response result message include a feasibility indication of the generated resource strategy; and based on determination of the feasibility indication of the resource strategy in the response result message, selectively perform one of:
  (a) the service in the first application process in accordance with the resource strategy, when the determining determines that the resource strategy is feasible, and
  (b) revision of the resource strategy and re-submission, by using the first application process, of the revised resource strategy to the resource controller process when the determining determines that the resource strategy is not feasible, wherein (a) performing the service in the first application process further includes:
  (1) locking the third level token bucket of the user that submitted the service requesting, the lock preventing consumptions of tokens for all other ones of the plurality of application processes that are not the first application process, and
  (2) while the third level token bucket of the user is locked for all other ones of the plurality of application processes that are not the first application process, using the at least one resources to carry out the service request for the first application process in accordance with consumption of tokens in the third level token bucket of the first user.

19. The non-transitory computer readable storage medium according to claim 18, wherein the performing includes revising the resource strategy and re-submitting by one of the plurality of application processes the revised resource strategy to the resource controller process, and subsequent to a determination by the resource controller process that the revised resource strategy is feasible, performing the service in accordance with the revised resource control strategy.

20. The non-transitory computer readable storage medium according to claim 18, wherein the instructions further cause the processing systems to:

perform the service and consume a number of said tokens corresponding to the amount of the at least one resource from the user level token bucket corresponding to the user that submitted the service request.

21. A distributed computing environment comprising:
a plurality of processing systems communicatively connected by a data communications network, each of the processing systems comprising at least one hardware processor, the plurality of processing systems configured to execute a plurality of application processes that are each associated with a first tenant account of tenant accounts of the distributed computing environment, where each unit of the resources of the distributed computing environment is represented as a token and the plurality of application processes are configured to consume tokens in correspondence with usage of the resources of the distributed computing environment, a storage system configured to store data for a hierarchy of token buckets, the hierarchy having at least three levels, with a first level corresponding to the distributed computing environment, a second level corresponding to the tenant accounts, and a third level corresponding to a plurality of users that are associated with the first tenant account, the plurality of application processes being executed by the distributed computing environment in association with the first tenant account;

at least one hardware processors of the plurality of processing systems configured to:
  receive, for a first application process of the plurality of application processes, a service request from a first user of the plurality of users that are associated with the first tenant account;
  in response to the reception of the service request:
    (a) lock the third level token bucket of the first user from consuming tokens for all other ones of the plurality of application processes that are not the first application process, and
    (b) while the third level token bucket of the first user is locked for all other ones of the plurality of application processes that are not the first application process, use the at least one resources to carry out the service request for the first application process in accordance with consumption of tokens in the third level token bucket for the first user;
  upon completion of the service request for the first application process, unlock the third level token of the first user to allow the first user to request that other ones of the plurality of application processes use the at least one resource.

22. The distributed computing environment of claim 21, wherein distribution of tokens to the second level is based on a type of tenant account for a corresponding tenant account, wherein there are at least two different types of tenant accounts.

* * * * *